US011580474B2

(12) United States Patent
Perl et al.

(10) Patent No.: US 11,580,474 B2
(45) Date of Patent: Feb. 14, 2023

(54) AUTOMATED, TELEMATICS-BASED SYSTEM WITH SCORE-DRIVEN TRIGGERING AND OPERATION OF AUTOMATED SHARING ECONOMY RISK-TRANSFER SYSTEMS AND CORRESPONDING METHOD THEREOF

(71) Applicant: Swiss Reinsurance Company Ltd., Zurich (CH)

(72) Inventors: Andri Perl, Oberhasli (CH); Sebastiaan Bongers, Au (CH); Donato Genovese, Zurich (CH); Hector Naves Sordo, Zurich (CH)

(73) Assignee: Swiss Reinsurance Company Ltd., Zurich (CH)

( * ) Notice: Subject to any disclaimer, the term of this patent is extended or adjusted under 35 U.S.C. 154(b) by 652 days.

(21) Appl. No.: 15/448,144

(22) Filed: Mar. 2, 2017

(65) Prior Publication Data

US 2018/0075380 A1 Mar. 15, 2018

Related U.S. Application Data

(63) Continuation of application No. PCT/EP2016/071384, filed on Sep. 10, 2016.

(51) Int. Cl.
*G06Q 10/06* (2012.01)
*G06Q 10/0635* (2023.01)
(Continued)

(52) U.S. Cl.
CPC ..... *G06Q 10/0635* (2013.01); *G06Q 30/0283* (2013.01); *G06Q 40/08* (2013.01); *G06Q 50/30* (2013.01); *G06Q 2240/00* (2013.01)

(58) Field of Classification Search
None
See application file for complete search history.

(56) References Cited

U.S. PATENT DOCUMENTS 8,799,036 B1 8/2014 Christensen et al.
9,390,452 B1 * 7/2016 Biemer ................. B60W 10/30
(Continued)

OTHER PUBLICATIONS

P. Handel et al., "Insurance Telematics: Opportunities and Challenges with the Smartphone Solution," in IEEE Intelligent Transportation Systems Magazine, vol. 6, No. 4, pp. 57-70, winter 2014, doi: 10.1109/MITS.2014.2343262. (Year: 2014).*

(Continued)

*Primary Examiner* — Cory W Eskridge
(74) *Attorney, Agent, or Firm* — Oblon, McClelland, Maier & Neustadt, L.L.P.

(57) ABSTRACT

Proposed is an automated telematics-based system (1) for score-driven operations associated with motor vehicles (41, ..., 45) or transportation means of passengers or goods and based on a dynamic, telematics-based data aggregation, and method thereof, for automated risk-transfer related to complex peer-to-peer lending schemes, especially related to vehicles and car sharing schemes and sharing economy transportation schemes related to risks associated with damages to third parties. The telematics-based system (1) comprises telematics devices (411, ..., 415) associated with the plurality of motor vehicles (41, ..., 45), wherein the telematics devices (411, ..., 415) comprise a wireless connection (42101-42108) to a central, expert-system-based circuit (11). The telematics devices (411, ..., 415) are connected via interfaces (421, ..., 425) to the sensors and/or measuring devices (401, ..., 405) and/or an on-board diagnostic system (431, ..., 435) and/or an in-car interactive device (441, ..., 445), wherein the telematics devices (411, ..., 415) capture usage-based (31) and/or user-based (32) and/or operational (33) telematics data (3) of the motor vehicle (41, ..., 45) and/or user (321, 322, 323). In response to an emitted shadow request (109) individualized risk-transfer profiles (114) based upon the dynamically generated variable scoring parameters (1011, ..., 1013) are transmitted from a first risk-transfer systems (11) to the corresponding motor vehicle (41, ..., 45) and issued by means of a user (Continued)

unit (461, ..., 465) of the motor vehicle (41, ..., 45) for selection by the driver of the motor vehicles (41, ..., 45). In return of issuing an individualized risk-transfer profile (114) over said user unit (461, ..., 465), payment-transfer parameters are transmitted from the first risk-transfer system (11) to the provider of the telematics-based system (1).

13 Claims, 5 Drawing Sheets

(51) Int. Cl.
  *G06Q 50/30* (2012.01)
  *G06Q 30/0283* (2023.01)
  *G06Q 40/08* (2012.01)

(56) References Cited

U.S. PATENT DOCUMENTS

| | | | | |
|---|---|---|---|---|
| 10,783,587 | B1* | 9/2020 | Augustine | G07C 5/0841 |
| 2012/0197669 | A1* | 8/2012 | Kote | G06Q 40/08 |
| | | | | 705/4 |
| 2013/0006674 | A1* | 1/2013 | Bowne | H04W 4/40 |
| | | | | 705/4 |
| 2014/0039935 | A1* | 2/2014 | Rivera | G06Q 40/08 |
| | | | | 705/4 |
| 2016/0371788 | A1* | 12/2016 | Rackley, III | G06Q 10/105 |

OTHER PUBLICATIONS

J. M. Schietekat and M. J. Booysen, "Detection of reckless driving in the Sub-Saharan informal public transportation system using acceleration-sensing telematics," Eurocon 2013, 2013, pp. 597-601, doi: 10.1109/EUROCON.2013.6625042. (Year: 2013).*

G. Castignani, T. Derrmann, R. Frank and T. Engel, "Driver Behavior Profiling Using Smartphones: A Low-Cost Platform for Driver Monitoring," in IEEE Intelligent Transportation Systems Magazine, vol. 7, No. 1, pp. 91-102, Spring 2015, doi: 10.1109/MITS.2014.2328673. (Year: 2015).*

International Search Report and Written Opinion of the International Searching Authority issued in PCT/EP2016/071384 dated Jan. 30, 2017.

* cited by examiner

AUTOMATED, TELEMATICS-BASED SYSTEM WITH SCORE-DRIVEN TRIGGERING AND OPERATION OF AUTOMATED SHARING ECONOMY RISK-TRANSFER SYSTEMS AND CORRESPONDING METHOD THEREOF

CROSS REFERENCE TO RELATED APPLICATION

This application is a continuation of PCT International Application No. PCT/EP2016/071384, filed on Sep. 10, 2016, the entire contents of which are incorporated herein by reference.

FIELD OF THE INVENTION

The present invention relates to mobile real-time systems reacting dynamically on captured environmental or operational parameters, in particular to monitoring, capturing and reacting telematics systems on automotive parameters of motor vehicles during operation. The present invention further relates to telematics-based automated systems for risk-transfer, alert and real-time notification for motor vehicles and wireless technology used in the context of telematics, in particular for automated risk-transfer related to (i) ride-hailing, including taxi ride-hailing risk-transfer systems (for example in the context of LIBER, (ii) car sharing (for example Daimler Car2go, BMW ReachNow), and (iii) peer-to-peer car sharing (for example Drivy). Finally, the invention also relates to telematics-based real-time expert systems. The term telematics, in particular traffic telematics, refers to systems that are used for communications, instrumentation and control, and information technology in the field of transportation. Thus, the present invention relates to the use of telematics together with real-time risk-monitoring, automated risk-transfer and insurance systems based on captured and measured usage-based and/or user-based telematics data.

BACKGROUND OF THE INVENTION

Sharing economy as well as peer-to-lending economy practices have become increasingly popular in recent years. From swapping systems to network transportation to private kitchens, sharing with strangers appears to be a new social trend. Although Uber, Airbnb, and other online platforms have shared access to a variety of services and facilities, issues have been raised as to public safety, health, and limited liability of these sharing economy practices. In addition, these innovative and fast developing practices have been counteracted by professionals offering similar services by arguing that the sharing economy and peer-to-peer lending opens the door to unfair competition. Regulators are challenged since there is a need to protect possible users of these practices from fraud, liability, and unskilled service providers. The related technical problems are complex since they touch many fields and often the border line to pure private use and risk-transfer is difficult to draw. However, the regulations and applied technology of these practices should still protect a user in a manner similar to the way in which they are protected by existing regulations for equivalent commercial services. At least, such regulations should serve the same goal, namely to protect possible users and to allow a safe use of such practices. On the other side, possible technical solutions applied to these problems and corresponding regulations should not restrict the innovative growth of shared economy practices, since the social and environmental benefits are virtually undisputed.

In general, the term "shared economy" is intended to capture new, collaborative forms of creation, production, distribution, trade and consumption of goods and services that are being enabled by new technological platforms. In this, Uber, and the like, at very least, allow one to begin imagining a different configuration of urban transportation services. The fundamental idea behind shared economy and peer-to-peer lending technologies is that such technology should enable society to use their resources more efficiently by replacing the ownership of goods with access. New, innovative technologies, such as real-time interconnecting mobile apps and online platforms, help to provide the technical backbone that allows for the unlocking of what is called the "idle capacities", for example of houses, cars, tools and utilities, by matching the haves of certain people with the wants of other people. Such technologies may thus help to reduce overall consumption and represent an important step towards more sustainable lifestyles. Ride-sharing is an example of a sharing economy: people driving from A to B can harness the "idle capacity" of their cars by filling their seats and splitting the cost of gas with travelers going to the same destination. Uber and its competitors such as Didi Chuxing or Lyft provide appropriate real-time or on-demand ride-hailing apps. However, as already mentioned, there is no clear distinction from the professional practices with approved technologies. These apps pretend to provide "ride-sharing" or "ride-hailing" services, which is, however, deceiving. Often, drivers, using such shared economy technology, do not happen to be riding through town and spontaneously decide to give somebody a ride. They are often semi-professional or private individuals looking to top up their paychecks, working as "informal" taxi drivers. Since they are on the road because of the app, it is not possible to speak of "idle capacity" here. Nothing is actually being shared, mislabeling themselves a "car-sharing" service, when, in fact, they are a private transportation company.

Moreover, there are more problems. Platforms like Uber are built on top of venture-capital-backed, hierarchically structured organizations. These platforms typically enable people to share their resources, skills, and time, as well as to finance and produce their goods in mildly more collaborative ways. However, in fact, they are little more than a transactional form of "sharing" not much different than that of conventional capitalist exchange. While the pretense of "sharing" should be the basis of the services, their offerings rarely mirror the actual penetration of collaboration in their organizational structure. Like Uber, a normally classical Weberian hierarchy is inherent, based upon a vertical, linear understanding of hierarchical superiority and subordination. At the bottom of the company, are the drivers who lack employment protection, have no official wage, and no say as regards their rights. Above the drivers, are the founders and management, who set the rules and aims of the organization and impose their decisions on the drivers. Above them, are the shareholders who provide capital for the organization, and who try to maximize the values of the shares through increased profits. With profit-maximization as their ultimate operational logic, companies like Uber, Lyft, and many others of the sharing economy, invariably favor efficiency over social impact, output over outcome. Such organizations put more emphasis on the question of maximization of profit, and not on the quality of the product that they produce, nor upon their social and environmental impact. Lastly, there are the users, who are confronted with a broad spectrum of risk-related uncertainties while using peer-to-peer lending or shared economy services. Thus, there is a real demand to provide technical solutions for these kinds of services.

It must be clarified that the term "sharing economy transportation" is normally not used in connection with car sharing network companies such as Uber. These firms typically call their services "ride sourcing" in order to clarify that drivers do not share a destination with their passengers. Nevertheless, their apps allow for the simple outsourcing of rides to commercial drivers. Therefore, even though these transportation network companies are advertised as ridesharing, they are in fact dispatched commercial operators, similar to taxi services. Examples of these "ride sourcing" companies are the aforementioned Uber, Lyft and/or Via and Haxi. In the context of the present application, the differentiation of shared economy and ride sourcing has no implication to the inventive system.

Other problems arise due to the fact, that classical risk-sharing or risk-transfer models are based on individual consulting services and individual contracting by human agents. Additionally, the risk-transfer is typically conducted in advance and for a predefined time period. However, for the ad-hoc decision-based shared economy and peer-to-peer lending schemes, such traditional methods can no longer be applied. Today, more than 200 start-ups, funded by approximately $2 billion in backing, compete in the growing market for peer-to-peer sharing of physical assets (cf. the "Sharing S-Curve", illustrating the sectorial growth in car sharing and peer-to-peer vehicle lending as compared to traditional car rentals, www.pwc.co.uk/issues/megatrends/collisions/sharingeconomy/the-sharing-economy-sizing-the-revenue-opportunity.html). These include "objects" such as cars, rides, accommodation, tools, toys, apparel, and household appliances. An example is the renting out of spare rooms or entire apartments as one of the services. According to the Economist, every day, Airbnb coordinates stays of over 40.000 people in more than 250.000 apartments, rooms, and houses in more than 30.000 cities distributed in 192 countries around the world during the summer of 2013. These figures are comparable to those of the biggest hotel chains such as InterContinental or Renaissance. Going beyond the example of Airbnb used to describe the sharing economy, the spectrum of goods or services that are conveyed via the World Wide Web is not limited to apartment stays, as discussed above. Besides flats and rooms, the sharing economy extends to books, DVDs, parking spots, access to Wi-Fi networks, vehicles, rides, neighborly help, creative projects, business ideas, loans, products for children, private lessons, groceries, own time or skills etc. Sharing economy schemes are not even limited to peer-to-peer markets such as eBay, Airbnb, or Getaround. Besides selling and renting, other forms of sharing include lending, donating, and barter. Access to something instead of ownership thereof is always at the center of the services. However, consumers and users are mostly left alone with the ever-evolving forms of sharing, because sharing usually occurs in private, as opposed to the work and market worlds. In addition, appropriate regulations for the protection of users are often impracticable, since there are no technical solutions which allow for the implementation of possible regulations or to cope with the dynamic and real-time interaction requirements of shared economy and peer-to-peer lending. Lastly, the above discussed mere amount of conducted shared economy and peer-to-peer lending transaction does not allow for the application of the traditional risk-transfer schemes, but need for automated systems that can be operated in real-time, electronically interacting with the described web-based shared economy or peer-to-peer lending platforms and systems.

As regards shared economy and peer-to-peer lending schemes concerning cars and rides sharing, there is a real lack of automated automotive and telematics-based risk-transfer, i.e. insurance, platforms; in particular, in the field of connected platforms related to sharing economy systems, for example such as for example, LIBER, Didi Chuxing Taxi, Rakuten (Lyft), Via, Haxi and nuTonomy; but also in the platforms of the OEMs, such as for example Car2Go (Daimler) or DriveNow (BMW). In the car industry, this trend is further boosted by the fact that, going forward, the OEMs (Original Equipment Manufacturers) are becoming the mobility service providers, which will reduce car ownership and people will solely focus on mobility risk-transfer.

In the prior art, modern automotive engineered car driving (including completely manually-controlled driving, partially autonomous car driving, driverless cars, self-driving cars, robotic cars) is associated with vehicles that are capable of sensing their environment and operational status or use. Such modern automotive engineered vehicles are capable of detecting a great variety of operational or surrounding parameters using for example radar, LIDAR (measuring device to measure distances by means of laser light), GPS (Global Positioning System), odometer (measuring device for measuring changes in position over time by means of the use of motion sensor data), and computer vision. In modern cars, advanced control systems often interpret sensory information to identify appropriate navigation paths, as well as obstacles and relevant signage. The sensors may comprise active and passive sensing devices, wherein sensors are physical converter devices measuring a physical quantity and converting the measured physical quantity into a signal which can be read by an observer or by another instrument, circuit or system. Commonly used sensors for automotive motor vehicle or mobile cell phones are for example infrared sensors containing an infrared emitter, and an infrared detector, for example used with touchless switches, passive infrared (PIR) sensors reacting and detecting only ambient IR, such as for example motion sensors, speed detectors, or such as for example radar guns such as microwave radars using the Doppler effect (the return echo from a moving object will be frequency shifted) or IR/Laser radars sending pulses of light for determining the difference in reflection time between consecutive pulses to determine speed, ultrasonic sensors emitting a sound and sensing for the echo to determine range, accelerometers measuring the rate of change of the capacitance and translating it into an acceleration by means of a proof mass, gyroscopes measuring a mass oscillating back and forth along the first axis, and plates on either side of the mass in the third direction where the capacitance changes when a rotation is detected around the second direction, IMU-sensors (Inertial Measurement Unit) providing a full 6-degree of freedom sensor by using a combination of accelerometer and gyroscope, force sensing resistor for example for contact sensing, touchscreens based on resistive, capacitive or surface acoustic wave sensing, location sensors such as GPS (Global Positioning System), triangulation or cell identification systems, visual sensors such as cameras and computer visions, SIM-based or RFID-based (Radio-Frequency Identification) sensors, or environment sensors such as moisture sensors, humidity sensors, temperature sensors etc. Said vehicles' capabilities for sensing its environment and operational status or use, is for example used in the above-mentioned advanced driver assistance systems (ADAS) which denote systems developed to automate/adapt/enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/traffic warnings, connect to smartphones, alert drivers of other cars or dangers, keep the driver in the correct lane, or show what is in blind spots.

Different forms of ADAS exist in the prior art, wherein some of the features are built into cars or are available as an add-on package. Often, there are also aftermarket solutions provided by third party suppliers. ADAS relies on inputs from multiple data sources, including the above-described automotive imaging, LiDAR, radar, image processing, computer vision, and in-car networking. Furthermore, inputs are also possible from other sources separate from the primary vehicle platform, such as other vehicles, referred to as Vehicle-to-vehicle (V2V), or Vehicle-to-Infrastructure (for example mobile telephony or Wi-Fi data network) systems. In the recent years, ADAS technology is one of the fastest developing fields in automotive electronics, with increasing rates of adoption of industry-wide quality standards, in vehicular safety systems (cf. for example ISO 26262 of the International Organization for Standardization (ISO)) developing technology specific standards, such as IEEE 2020 for Image Sensor quality or communications protocols such as the Vehicle Information API (Application Programming Interface). ADAS is clearly pushing the development of wireless network connectivity to offer improved value by using car-to-car (also referred as Vehicle to Vehicle (V2V)) and car-to-infrastructure (also referred as Vehicle to Infrastructure (V2X)) data.

The above outlined development of device and user monitoring, typically referred to as telematics, strongly influenced and still influencing the electronic, telecommunication added value services and risk-transfer (insurance) industry developing similar or consistent technical strategies to improve the effectiveness of interactions and the immediacy (real-time) interaction with customers. The needed components are today increasingly pure technology components. Social networking, telematics, service-oriented architectures (SOA) and usage-based services (UBS) are all interacting and pushing this development. Social platforms, such as for example Facebook, Twitter and YouTube, offer the ability to improve customer interactions and communicate product information. However, the field of telematics is larger still, as it introduces entirely new possibilities that align the technical input requirements and problem specifications of dynamic risk-transfer, technology and mobility. SOA and telematics are becoming keys to managing the complexity of integrating known technologies and new applications. Technically, telematics being a composite of telecommunication and information technology, is an interdisciplinary technical term encompassing telecommunications, vehicular technologies, road transportation, road safety, electrical engineering (sensors, instrumentation, wireless communications, etc.), and information technology (multimedia, Internet, etc.). Thus, the technical field of mobile parameter sensing, data aggregation or telematics are affected by a wide range of technologies, such as the technology of sending, receiving and storing information via telecommunication devices in conjunction with control over remote objects, the integrated use of telecommunications and informatics for applications in vehicles and for example with control of vehicles on the move, GNSS (Global Navigation Satellite System) technology integrated with computers and mobile communications technology in automotive navigation systems. The use of such technology together with road vehicles is also called vehicle telematics. In particular, telematics trigger the integration of mobile communications, vehicle monitoring systems and location technology by allowing a new way of capturing and monitoring real-time data. Usage-based risk-transfer systems, such as for example that provided by the so-called Snapshot technology of the firm Progressive, link risk-transfer compensation or premiums to monitored driving behavior and usage information gathered by an in-car "telematics" device. In the past five years, telematics devices show expanded use in cars by a factor 10 to 100. On such a broadened platform, telematics devices and systems may help to increase safety and improve driving behavior.

Vehicle telematics refer to the installation or embedding of telecommunication devices mostly in mobile units, such as for example cars or other vehicles, to transmit real-time driving data, which for example can be used by third parties' systems, as automated risk-monitoring and risk-transfer systems, providing the needed input for example to measure the quality and risks of individual drivers. The telematics instruments for such changes are available in the market. Vehicle tracking and global positioning satellite system (GPS) technologies are becoming commonplace, as are the telecommunication devices that allow us to be connected from almost anywhere. In particular, dynamically monitored and adapted risk-transfer could be imaginable by interconnecting telematics with other real-time measuring systems. Advantages provided by such systems could for example include, that after getting involved into a car accident, emergency and road services could be automatically activated, vehicle damage assessed, and the nearest repair shop contacted. In summary, the customer experience could be transformed beyond traditional operability of risk-transfer systems and insurance coverage to real-time navigation and monitoring, including the automated activation of concierge service, safe driving tips, video-on-demand for the kids in the backseat, in-car or online feedback, and real-time vehicle diagnostics.

In addition to real-time surveillance, it is to be mentioned, that an insurance agent may want to exchange information with a customer associated with insurer for a number of different reasons. However, the information exchange between the customer and the insurer and/or the insurer and the reinsurer is generally still cumbersome and time-consuming, and thus, risk-transfers provided by such structures typically remain static within a fixed, agreed upon, time period. For example, an existing or potential consumer may access an insurance agent's web page to determine a yearly or monthly cost of an insurance policy (for example hoping to save money or increase the level of protection by selecting a new insurance company). The consumer may provide basic information to the insurance agent (for example name, a type of business, date of birth, occupation, etc.), and the insurance agent may use this information to request a premium quote from the insurer. In some cases, the insurer will simply respond to the insurance agent with a premium quote. In other cases, however, an underwriter associated with insurer will ask the insurance agent to provide additional information so that an appropriate premium quote can be generated. For example, an underwriter might ask the insurance agent to indicate how often, where and at which times a motor vehicle is mainly used or other data such as age of the motor vehicle and intended use (transportation etc.). Only after such additional information is determined, an appropriate risk analysis can be performed by the insurer to process an adapted underwriting decision, and/or premium pricing.

Integrated telematics technologies may offer new technological fields, in particular in monitoring and steering, by means of centralized expert systems, such as for example in the risk-transfer technology far more accurate and profitable pricing models, provided by such automated expert systems. This would create a huge advantage, in particular for real-time and/or usage-based and/or dynamically operated systems. The advantage of such telematics systems is not restricted to risk transfer, inasmuch as there also advantages for example in fleet management that monitor employees' driving behavior via telematics, improving asset utilization, reduce fuel consumption and improve safety etc. etc. Other fields may also benefit from such integrated telematics systems, as state and local governments need to strive to improve fuel consumption, emissions and highway safety. Some states, for example, recently issued dynamic pay-as-you-drive (PAYD) regulations, which allow insurers to offer drivers insurance rates based on actual versus estimated miles driven. It's a financial incentive to drive less.

Already now, the telematics technology provides the above-mentioned features in the form of an accelerometer allowing to assess driving style and behavior, thus expanding the risk factors normally tracked from the current 40 to more than 100. As demand for accelerometers has increased, auto-makers and device manufacturers have been able to push down the unit cost. The need for increased connectivity and access (driven by the "always-connected" consumer) will allow additional device applications. It is to be pointed out that most technologies in the telematics ecosystem are not unique to the insurance of vehicles. Social listening, neighborhood protection portals and home monitoring have an impact on how home and property insurance risks are assessed. Furthermore, monitoring systems are available to adjust home temperature controls or automatically dispatch service providers should there be a water, heat or air-conditioning issue in a home. Also, telematics technologies are being developed for healthcare and senior living products, including location-based alerts, health-monitoring, and family-tracking services that may be used for how individual risk is assessed, allowing optimized risk-transfer in the life risk-transfer field. Examples also include robotic nurse's aides designed to remind the elderly about routine activities, as well as to guide them through their homes and call for help in case of emergencies. These types of applications will continue to evolve as technology becomes more reliable and cost effective and as the need for such solutions increases in the elderly and home-care sectors.

Telematics technology, as used in the way of the present invention, may also provide the basis technology for Service-oriented architectures (SOAs) or usage-based and/or user-based applications. Both are considered among the most promising of today's technologies. SOAs allow companies to make their applications and computing resources (such as customer databases and supplier catalogs) available on an as-needed basis, either via an intranet or the Internet. Based on a plug-and-play concept, SOA provides reusable software components across multiple technology platforms. It offers a new approach to software deployment while also tackling serious problems, such as complexity and ineffective data integration. This approach provides consistent technology, making it easier to access data and to integrate both new and old content. Information and services are centralized and reusable, shortening development times and reducing maintenance costs. When a software service is needed (such as retrieving customer information) the user or system sends a request to a directory, which determines the proper service name, location and required format, and then sends back the desired output (in this case, customer information). Users and other applications do not need to know the internal workings of the data handling or processing. Nor do organizations need to own and maintain software; they just access the appropriate service over the Internet or network, or another data transmission network. However, telematics technology, as used in the way of the present invention, may also provide the basis technology for other platforms, such as for example IoT-platforms (Internet of Things), which provide the network of physical devices, vehicles, buildings and/or other items embedded with electronics, software sensors, actuators and network connectivity that enables these objects to collect and exchange data. In particular, IoT allows objects to be sensed and controlled remotely across existing network infrastructures, also allowing for a more direct integration of the physical world into processor-driven systems and computer means. This integration results in improved efficiency, accuracy and economic benefits. When IoT comprises sensors and actuators, the technology becomes a more general system-class of cyber-physical systems, which may encompass technologies such as smart grids, smart homes, intelligent transportation, and smart cities. In IoT, each thing is uniquely identifiable through its embedded computer system, and is also able to interoperate with the existing Internet infrastructure. IoT provides advanced connectivity of devices, systems, and services that goes beyond machine-to-machine (M2M) communications and covers a variety of protocols, domains and applications. These are incorporated herein by reference. The interconnection of these embedded devices (including smart objects), is applicable in automation in nearly all fields, while also enabling advanced applications like a smart grid, and smart cities. Things in the IoT refer to a wide variety of devices, but in particular to automobiles with built-in sensors, analysis devices for environmental monitoring or field operation devices, that can assist car drivers, for example, in search and rescue operations. Thus, things in the IoT can comprise a mixture of hardware, software, data and/or services. Such devices collect useful data with the help of various existing technologies and then autonomously flow the data between other devices. Current examples include the numerous prototype autonomous or half-autonomous vehicles currently developed, including Mercedes-Benz, General Motors, Continental Automotive Systems, IAV, Autoliv Inc., Bosch, Nissan, Renault, Toyota, Audi, Volvo, Tesla Motors, Peugeot, AKKA Technologies, Vislab from the University of Parma, Oxford University and Google, for example, using interconnected telematics devices with appropriate network technology for control, monitoring, operating and steering of the half or fully automated vehicles.

SUMMARY OF THE INVENTION

It is one object of the present invention to provide a fully automated automotive and telematics-based risk-transfer system, in particular in the field of connected platforms related to sharing economy systems (such as for example UBER, Didi Chuxing Taxi, Rakuten (Lyft), Via and Haxi, or own platforms of OEMs, such as for example Car2Go (Daimler) or DriveNow (BMW)) and corresponding insurance systems. In particular, it is an object of the present invention to provide a fully automated risk-transfer system allowing automated and dynamic adaptable risk-transfer in real-time. It is a further object of the present invention to provide a mobile automotive system that dynamically reacts, in real-time, to captured environmental or operational parameters of motor vehicles during operation, in particular to measuring parameters of automotive systems, allowing a user to dynamically and in real-time adapt a vehicle's operation or driving risks by means of an automated risk-transfer engine allowing to dynamically select appropriate risk-transfer profiles, based upon monitoring, capturing and reacting to automotive parameters of motor vehicles during operation. Furthermore, it is an object of the invention to dynamically trigger automated, telematics-based automotive systems based on real-time capturing of vehicle telematics data. In particular, it is an object of the present invention to extend the existing technology to a dynamically triggered and dynamically adjustable, multi-tier risk-transfer system based on a dynamically adaptable or even floating first-tier level risk-transfer, thereby reinforcing the importance of developing automated systems allowing reactive self-sufficient, real-time operation. Another object of the invention seeks to provide a way to technically capture, handle and automate dynamically adaptable, complex and difficult to compare risk transfer structures by the user and trigger related operations to automate optimally shared risks and transfer operations. Another object of the invention is to dynamically synchronize and adjust such operations to changing environmental or operational conditions by means of invasive telematics data, harmonized use of telematics between the different risk-transfer systems based on an appropriate technical trigger structure approach, thus making the different risk-transfer approaches comparable. In contrast to standard practice, the resource pooling systems of the different risk-transfer system shall create a comparable risk-transfer structure, allowing to optimize risk-transfer operation with the desired, technically-based, repetitive accuracy that relies on technical means, process flow and process control/operation. Along the automated insurance telematics value chain, there are many technologies offering individual elements, however, it is an object of the present invention to provide a holistic technical solution that covers the whole range from device installation and data capturing to the automated and accurate risk measurement, analysis and management. Finally, it is a further object of the invention to provide a dynamic, expert scoring system based on real-time scoring and measurements, and further to provide a technically scalable solution based on scoring algorithms and data processing, allowing to adapt and compare the signaling to other fields of automated risk-transfer.

According to the present invention, these objects are achieved, particularly, with the features of the independent claims. In addition, further advantageous embodiments can be derived from the dependent claims and the related descriptions.

According to the present invention, the above-mentioned objects for an automated, telematics-based system triggering score-driven operation associated with motor vehicles or transportation means of passengers or goods, are achieved, particularly, in which, by means of the present invention, the telematics-based system comprises telematics devices associated with the plurality of motor vehicles, wherein the telematics devices capture usage-based and/or user-based and/or operational telematics data of the motor vehicle and/or user, and wherein the plurality of telematics devices of the motor vehicles are connected via a data transmission network to a central, expert-system-based circuit of the telematics-based, score-driven system, wherein a data link is set up by means of a wireless connection between the central, expert-system-based circuit transmitting at least the captured usage-based and/or user-based and/or operational telematics data from the telematics devices to the central, expert-system-based circuit, in which the telematics-based, score-driven system comprises one or more first risk-transfer systems to provide a first risk-transfer based on first risk transfer parameters from at least some of the motor vehicles to one of the first risk-transfer systems, wherein the first risk-transfer systems comprise a plurality of payment transfer modules configured to receive and store first payment parameters associated with risk-transfer of risk exposures of said motor vehicles for pooling of their risks, in which by means of a vehicle-telematics driven aggregator of the central, expert-system-based circuit risk-related usage-based and/or user-based and/or operational telematics data captured from the telematics devices are triggered and monitored by means of telematics data-based triggers in the dataflow pathway of the telematics devices, in which by means of a driving score module of the central, expert-system-based circuit, a single or a compound set of variable scoring parameters are measured and/or generated, profiling the use and/or style and/or environmental condition of driving during operation of the motor vehicle based upon the captured, triggered and monitored risk-related usage-based and/or user-based and/or operational telematics data, wherein the variable scoring parameters comprise at least scoring parameters measuring a driver score measuring behavioral parameters of the driver, and/or a contextual score comprising at least the number of intersections and/or road type, and/or a vehicle safety score comprising at least activated ADAS/AV features of the motor vehicle, and/or a mobility score comprising at least lending period and/or number of passengers, in which by means of the central, expert-system-based circuit a shadow request is transmitted to at least one of the first risk-transfer systems that are decentrally connected to the central, expert-system-based circuit over a data transmission network, wherein the shadow request comprises at least said single or a compound set of variable scoring parameters based upon the captured, triggered and monitored risk-related usage-based and/or user-based and/or operational telematics data, and in which, in response to the emitted shadow request, one or more individualized risk-transfer profiles for the corresponding motor vehicle based upon the dynamically collected single or compound set of variable scoring parameters are transmitted from at least one first risk-transfer systems to a user unit associated with the motor vehicle, wherein the individualized risk-transfer profiles can be selected by the user by means of the user unit, and wherein upon selection of an individualized risk-transfer profile, an associated risk-transfer is automatically performed from the corresponding motor vehicle to the first risk-transfer system of the selected individualized risk-transfer profile. The telematics devices can for example comprise one or more wireless connections or wired connections and a plurality of interfaces for connection with at least one of a vehicle's data transmission bus, and/or a plurality of interfaces for connection with sensors and/or measuring devices and/or for connection with the dashboard and/or infotainment system and/or for connection with a mobile phone application, wherein, for providing the wireless connection, the telematics device acts as wireless node within the data transmission network by means of antenna connections of the telematics device and wherein the telematics devices are connected via the interfaces to the sensors and/or measuring devices and/or an on-board diagnostic system and/or an in-car interactive device. The telematics devices, especially the sensors and/or measuring devices, can be embedded in the vehicle, in particular OEM-linked, and/or at least partially mobile-node-integrated. The on-board sensors and/or measuring devices and/or an on-board diagnostic system and/or an in-car interactive device can for example comprise proprioceptive sensors for sensing operating parameters of the motor vehicle and/or exteroceptive sensors for sensing environmental parameters during operation of the motor vehicle. The automated and telematics-based-system can for example further comprise a second risk-transfer system to provide a second risk-transfer based on second risk-transfer parameters from one or more of the first risk-transfer systems to the second risk-transfer system, wherein the second risk-transfer system comprises second payment transfer modules configured to receive and store second payment parameters for pooling of the risks of the first risk-transfer systems associated with risk exposures transferred to the first risk-transfer systems, and in which the central, expert-system-based circuit is associated with the second risk-transfer system. The variable driving score parameter can for example at least be based upon a measure of driver behavior parameters, comprising speed and/or acceleration and/or braking and/or cornering and/or jerking, and/or a measure of distraction parameters comprising mobile phone usage while driving and/or a measure of fatigue parameters and/or alcohol use parameters and/or drug use parameters. The variable contextual scoring parameter can for example at least be based upon measured trip score parameters, based upon road type and/or number of intersection and/or tunnels and/or elevation, and/or measured time of travel parameters, and/or measured weather parameters and/or measured location parameters, and/or measured distance driven parameters. The variable vehicle safety scoring parameter can for example at least be based upon measured ADAS feature activation parameters and/or measured vehicle crash test rating parameters and/or measured level of automation parameters of the motor vehicle and/or measured software risk score parameters. The plurality of individualized risk-transfer profiles provided by the automated risk-transfer supplier systems can for example time-dependently vary based on the measured time-dependent use and/or style and/or environmental condition of driving by means of the triggered, captured, and monitored operating parameters or environmental parameters during operation of the motor vehicle. The automated first risk-transfer systems provide a first risk-transfer based on first risk transfer parameters from the motor vehicle to the respective first risk-transfer system, wherein the first risk-transfer system comprises a plurality of payment transfer modules configured to receive and store first payment parameters associated with risk-transfer of risk exposures of said motor vehicles for pooling of their risks. The risk-relevant parameters of the shadow request can for example comprise at least parts of the generated single or set compound of variable scoring parameters and/or at least parts of the usage-based and/or user-based and/or operating telematics data captured by means of the telematics devices. The one or more wireless connections or wired connections of the telematics devices can for example comprise Bluetooth or Bluetooth LE and/or Wi-Fi and/or WiMAX as wireless connection for exchanging data using short-wavelength UHF (Ultra high frequency) radio waves in the ISM (industrial, scientific and medical) radio band from 2.4 to 2.485 GHz by building a personal area network (PAN) with on-board Bluetooth capabilities or Bluetooth LE (Low Energy) and/or 3G or 4G and/or GPS and/or GPRS and/or BT based on Wi-Fi 802.11 standard and/or WiMAX, and/or a contactless or contact smart card, and/or a SD card (Secure Digital Memory Card) or another interchangeable non-volatile memory card.

As an embodiment, the on-board sensors and measuring devices and/or telematics devices and/or on-board diagnostic system and/or in-car interactive device can for example comprise the above-mentioned proprioceptive sensors and/or measuring devices for sensing the operating parameters of the motor vehicle and/or exteroceptive sensors and/or measuring devices for sensing the environmental parameters during operation of the motor vehicle. The on-board sensors and measuring devices can for example comprise at least a GPS module (Global Positioning System) and/or geological compass module based on a 3-axis teslameter and a 3-axis accelerometer, and/or gyrosensor or gyrometer, and/or a MEMS accelerometer sensor consisting of a cantilever beam with the seismic mass as a proof mass measuring the proper or g-force acceleration, and/or a MEMS magnetometer or a magnetoresistive permalloy sensor or another three-axis magnetometers. The defined risk events associated with transferred risk exposure of the motor vehicles can, for example, comprise at least transferred risk exposure related to liability risk-transfers for damages and/or losses and/or delay in delivery, wherein the occurred loss is automatically covered by the first risk-transfer system based on the first risk transfer parameters and correlated first payment transfer parameters (if a requested risk-transfer is not rejected by the system at this time). The exteroceptive sensors or measuring devices can, for example, comprise at least radar devices for monitoring the surroundings of the motor vehicle and/or LIDAR devices for monitoring the surroundings of the motor vehicle and/or global positioning systems or vehicle tracking devices for measuring positioning parameters of the motor vehicle and/or odometer devices for complementing and improving the positioning parameters measured by the global positioning systems or vehicle tracking devices and/or computer vision devices or video cameras for monitoring the surroundings of the motor vehicle and/or ultrasonic sensors for measuring the position of objects close to the motor vehicle. For providing the wireless connection, the mobile telecommunication apparatus can for example act as wireless node within a corresponding data transmission network by means of antenna connections of the telematics devices, in particular mobile telecommunication networks such as for example 3G, 4G, 5G LTE (Long-Term Evolution) networks or mobile WiMAX or other GSM/EDGE and UMTS/HSPA-based network technologies etc., and more particular with appropriate identification means such as SIM (Subscriber Identity Module) etc. The telematics devices can for example be connected to an on-board diagnostic system and/or an in-car interactive device, wherein the telematics devices capture usage-based and/or user-based and/or operational telematics data of the motor vehicle and/or user. Further, the telematics devices can for example be connected to an in-car interactive device and/or on-board diagnostic system, wherein the vehicle's speed and travel distances is monitored by a global positioning system (GPS) circuit and wherein the telematics data are transmitted via the telematics devices to the central, expert-system-based circuit by means of a cellular telecommunication connection. As mentioned, the telematics devices can comprise vehicle embedded telematics devices (OEM line fitted) or mobile node integrated telematics devices. The telematics devices can for example provide the one or more wireless connections by means radio data systems (RDS) modules and/or positioning system including a satellite receiving module and/or a mobile cellular phone module including a digital radio service module and/or a language unit in communication with the radio data system or the positioning system or the cellular telephone module. The satellite receiving module can for example comprise a Global Positioning System (GPS) circuit and/or the digital radio service module comprising at least a Global System for Mobile Communications (GSM) unit. The plurality of interfaces of the mobile telecommunication apparatus for connection with at least one of a motor vehicle's data transmission bus can, for example, comprise at least one interface for connection with a motor vehicle's Controller Area Network (CAN) bus, for example in connection with on-board diagnostics (OBD) port, or other connection, for example, for battery installed devices, or also OEM (Original Equipment Manufacturer) installed systems getting information access to on-board sensors or entertainment systems (such as for example Apple CarPlay etc.) providing the necessary vehicle sensor information. The central, expert-system-based circuit can further comprise an aggregation module providing the risk exposure for one or a plurality of the pooled risk exposed motor vehicles based on the captured risk-related telematics data, wherein the first and second risk transfer parameters and the correlated first and second payment transfer parameters are dynamically generated based on the likelihood of the occurrence of the predefined risk events of the pooled motor vehicles. In addition, the occurred and triggered losses can be automatically aggregated by means of captured loss parameters of the measured occurrence of risk events over all risk exposed motor vehicles within a predefined time period by incrementing an associated stored aggregated loss parameter and for automatically aggregating the received and stored first payment parameters over all risk exposed vehicles within the predefined time period by incrementing an associated stored, aggregated payment parameter, and wherein the variable first and second risk transfer parameters and the correlated first and second payment transfer parameters dynamically are generated based upon the ratio of the aggregated loss parameter and the aggregated payment parameter. The first and second risk-transfer system can for example be fully automated steered, triggered, signaled, and mutually activated by means of the central, expert-system-based circuit, wherein the steering, triggering, signaling and activating is based on the dynamic-adaptable first and second risk transfer parameters and the correlated first and second payment transfer parameters, providing a self-sufficient risk protection for the variable number of motor vehicles associated with the telematics-based system by means of the coupled first and second insurance system. In the context of the first- and second risk-transfer tier, the first risk-transfer system can for example comprise an automated first resource pooling system and the second risk-transfer system comprises a automated second resource pooling system, wherein the risk-exposed motor vehicles are connected to the first resource pooling system by means of a plurality of payment transfer modules configured to receive and store first payments from the risk-exposed motor vehicles for the pooling of their risk exposures, wherein the first risk-transfer system provides automated risk protection for each of the connected risk exposed motor vehicles based on received and stored first payment parameters, wherein the first risk-transfer system is connected to the second resource pooling system by means of second payment transfer module configured to receive and store second payment parameters from the first insurance system, for adopting of a portion of the risk exposures accumulated by the first risk-transfer system, and wherein, in the case of the occurrence of one of defined risk events, the occurred loss is automatically covered by the expert-system-based telematics system.

Focus of the present invention is providing an automated, technical, real-time operable solution for capturing and risk-transfer of (a) peer-to-peer lending schemes, especially related to car-sharing schemes and (b) of sharing economy transportation schemes, including related damage risks of third parties. Automated mobility risk-transfer is a key feature of the invention. Going forward, the inventive systems allows third parties, such as OEMs (car sharing of OEMS are for example Daimler Car2Go, BMW's drive now or GM's Maven) to become the mobility service providers, in particular the mobility risk-transfer provider, which will reduce car ownership and people will solely focus on mobility risk-transfer, i.e. insurance. In that sense, the system also makes it possible to provide automated mobility insurance risk solutions directly to, for example, an OEM based on the miles driven, number of passengers or on the driver of a ride-hailing company such as Uber. Therefore, one of the advantages of the present system is to provide a fully automated automotive and telematics-based risk-transfer system, in particular in the field of connected platforms related to sharing economy systems (such as for example UBER, Didi Chuxing Taxi, Rakuten (Lyft), Via and Haxi or own platforms of OEMs such as for example Car2Go (Daimler) or DriveNow (BMW)) and corresponding insurance systems. In particular, it technically allows the provision of a fully automated risk-transfer system allowing automated and dynamic adaptable risk-transfer in real-time. Furthermore, the system has the advantage to allow provision of a technical and comprehensive solution that scores individual drivers based upon telematics data, in particular data sourced from CAN BUS or TCU (Telematics Control Unit), or through the car manufacturers or mapping providers' data cloud. This has the advantage to access new data points which cannot be accessed through blackbox, OBD or other telematics devices. This approach furthermore builds a bridge between the main accident contributing factors to risk factors, to telematics data points for scoring purposes, in order to have a precise risk assessment. As an example, one can look to the USA, where the No 2 accident cause is speeding. The present innovation makes it possible to take into account speeding and other data points such as, for example, NAVI (Automotive Navigation System) vehicle speed information, vehicle speed at brake operation (trip data), or for example, the braking information can be coupled with the activation of ADAS systems such as ABS (Anti-lock braking system) or ESC (Electronic Stability Control) during a driving event (instead of G forces). Based on the score and other relevant telematics data visible to consumers and insurers (if the consumer agrees), insurers are able to quote. The present invention allows for a complete new way for automated risk-transfer for motor vehicles in the field of shared economy and peer-to-peer lending schemes, wherein the second risk-transfer system (reinsurer) is able to respectively provide and distribute risk-transfers (insurance) as primary provider or through car manufacturers and OEMs of the motor vehicles. The present system is completely flexible with regard to the risk-exposed motor vehicle or the insured. For example, the present system may provide a dynamic and completely individually adapted real-time risk-transfer for a motor vehicle and/or consumer. Afterwards, the consumer may also select an insurance provider based on quotes. Based on its flexibility, the applicability of the present invention is not restricted to risk-transfer in the context of motor vehicle, but can also be applied to other fields of risk-transfer, in particular to other fields of shared economy and peer-to-peer lending schemes, such as for, example, AirBnB or the like. The invention allows for the provision of an automated and telematics-based risk-transfer platform (that allows almost fully automated risk-transfer, incl. policy issuing, claims handling etc.). The provider of the second risk-transfer system, i.e. the reinsurer, the OEM/car manufacturers or an independent third provider can act as distributor of the risk-transfers (insurances) through mobile (smart phone) applications or vehicle embedded devices, for example, infotainment system. The invention also allows to technically enable features such as TBYB (Try Before You Buy) features, for example, by providing a free trial period of risk transfer, which is not possible for competing risk-transfers by prior art systems. Second risk-transfer systems are able to analyze telematics data from the vehicles (embedded device) to provide a scoring of the driving style and data then transferred to associated first insurance systems which can give a quote based on the score obtained. Thus, also the second risk-transfer system is able to optimize its operational risk-transfer parameters. The central, expert-system-based circuit scores and provides issuing of quote through dashboard/car's touchscreen and/or mobile phone applications running on a mobile phone. The inventive system and platform provides end customer the choice to freely select a risk-transfer provider and product (for example PHYD (Pay how you Drive) or PAYD (Pay as you Drive)) based on these quotes. In PHYD, the risk-transfer systems may, for example, offer discounts based upon the personal driving behaviour (how a person brakes, accelerates, turns). The discounts are based on telematics devices installed in the motor vehicle or the mobile phone running an appropriate mobile phone application and the corresponding captured telematics data that measure behaviour and location over time. In PAYD, the risk-transfer systems may, for example, offer discounts based on mileage (how much a person drives) and not where or how. They can for example be based on odometer readings captured via the telematics devices, aggregated GPS data if such a device is installed, or odometer readings from other telematics devices installed in the car. The inventive telematics-based devices with mobile phone telematics and/or vehicle embedded telematics devices allows the provision of added value services to motor vehicles/policyholders, both risk-transfer and/or other services. The present inventive system allows the provision of its core functionality through the mobile phone application or dashboard/infotainment system/touchscreen of the motor vehicle. It is a fully automated system for the provision of driver rating/scoring/behaviour comparison, for the issuance of quotes through the smart phone application or the dashboard (aggregator module/quotation by various first risk-transfer systems (insurances) and comparison), trial period, policy information (billing, claims, policy information)/data exchange with digital platform/claims handling (potentially up to a threshold). As mentioned, the invention can also be realized merely by a link to a smartphone app or an embedded app in above devices. The telematics devices may be realized so as to maintain smartphone projection standards to allow mobile devices running a certain operating system to be operated in automobiles through the dashboard's head unit or a smart phone application of a smart phone. Examples may include Apple CarPlay, Mirrorlink, Android Auto, on-board navigation systems. For the telematics devices, there may also exist other device sources, such as for example, aftermarket and retrofitted devices (windscreen device, black box, OBD dongle, CLA device (cigarette lighter adaptor), eCall OBU, navigation system) as standalone or with link to smartphone app or internet webpage or smart watch or other wearables. The invention is not restricted to any connection standard. It may be used, for example, based on NB-IOT and/or Wi-Fi and/or Bluetooth and/or cellular and/or ultra-narrow band (UNB) and/or a Low Power Wide Area (LPWA) (internet). Lastly, the present invention allows one to implement added features or services, such as automated policy module, incl. automated underwriting, claims handling module, technical accounting module (for example, for monthly billing), client management modules, and/or additional telematics modules such as driver feedback, positive selection, reward, loyalty program, engagement, gamification, social media integration, interface for added value services (for example, e-call, crash notification, crash reporting etc.), etc. Further value added services may be integrated in the present inventive system and technically automated, such as for example, stolen vehicle recovery, stolen vehicle tracking, post-accident services, crash reporting, driver coaching/training, eCall/bCall, reward, real-time feedback, driver scoring, driver safety training, real time traffic information, remote diagnostics, fuel consumption, location and prices of gas stations, POI service, social networking, scheduling and dispatch Geo-fencing, repair costs calculation, fleet management and tracking, ridesharing functionality (autonomous vehicles) or car sharing reservations, and/or "last mile" feature (if the car is parked).

Further, the present invention provides a completely transparent application of complex risk-transfer assessments, where telematics devices dynamically collect data when people drive during shared economy ridings or peer-to-peer lending car use. Users can easily use the inventive system by means of the mobile phone application or car integrated devices, such as dashboard. The present invention does not have to be restricted to interaction via OEM telematics, but could also be an aftermarket telematics device. Aftermarket devices can comprise (for example, Windscreen device, Black box, OBD dongle, CLA device (cigarette lighter adaptor), eCall OBU, navigation system) as standalone or with a link to the inventive cellular phone node application. As a variant, smartphone projection standards may allow mobile devices running a certain operating system to be operated in automobiles through the dashboard's head unit. Examples include Apple Carplay, Mirrorlink, Android Auto, Onboard navigation systems. Other aggregator devices can be provided, for example, by the mobile network node or smart phone and/or an embedded OEM device and/or infotainment system and/or dashboard's head unit and/or car's touchscreen (for example, in cars like Tesla) etc. The data can, for example, be analyzed by a third party to provide a scoring of the driving style and then transferred to primary insurer partners which can give a quote based on the score obtained. It may include other relevant data that insurers can use to differentiate and steer their portfolio. Thus, the inventive system allows providers/aggregators to bring new telematics consumers to insurers, where the consumers can dynamically select an insurance provider, based on these quotes. The telematics-vehicle data allow to dynamically capture a vast number of risk-factors, in addition to risk-factors that are considered by prior art systems. Such risk factors can, for example, comprise time-dependent speed measuring, hard braking, acceleration, cornering, distance, mileage (PAYD), short journey, time of day, road and terrain type, mobile phone usage (while driving), weather/driving conditions, location, temperature, blind spot, local driving, sun angle and dazzling sun information (sun shining in drivers' face), seatbelt status, rush hour, fatigue, driver confidence, throttle position, lane changing, fuel consumption, VIN (vehicle identification number), slalom, excessive RPM (Revolutions Per Minute), off road, G forces, brake pedal position, driver alertness, CAN (Controller Area Network) bus (vehicle's bus) parameters including fuel level, distance to other vehicles, distance to obstacles, driver alertness, activated/usage of automated features, activated/usage of Advanced Driver Assistance Systems, traction control data, usage of headlights and other lights, usage of blinkers, vehicle weight, amount of vehicle passengers, traffic sign information, junctions crossed, jumping of amber and red traffic lights, alcohol level detection devices, drug detection devices, driver distraction sensors, driver aggressiveness, driver mental and emotional condition, dazzling headlights from other vehicles, vehicle door status (open/closed), visibility through windscreens, lane position, lane choice, vehicle safety, driver mood, and/or passengers' mood. Up-to-now, no prior art system is able to process such a variety of dynamic-monitored, risk-relevant data. The advantage of the generated score parameters mirrors the captured sensory data in that the data components of the score can even, for example, comprise: customer policy details, individual driving data, crash forensics data, credit scores, statistical driving data, historic claims data, market databases, driving license points, statistical claims data, context data of weather or road type or surrounding. This broad monitoring capability further allows for the provision of a technical solution for the optimized coupling of the two automated risk-transfer systems with a better and more effective technical implementations, thereby enabling to share and minimize the needed automotive resources and to provide a unified, optimized multi-tier risk-transfer approach by sharing expert and development means for generating minimized conditions for the necessarily required resource-pooling (for example, pooled premiums). The present invention provides a holistic technical solution that covers the whole range of risk-transfer structures from collecting sensor and ADAS (advanced driver assistance systems, or active safety) data to accurate risk analysis for automated risk-transfer systems/coverage and value added services (for example, car sharing solutions, fleet management, alerts, cross-selling, consultancy), which is not possible with the prior art systems. The present invention provides an automated risk-transfer system for all kinds of risk-transfer schemes, such as for example, motor or product liability (re-)insurance systems and/or risk-transfer systems related to or depending on partially or fully automated vehicles. Also, the present invention provides a holistic and unified, automated technical approach for coverage of the motor vehicles in all different structures of risk-transfer, such as for example, product liability for car and/or technology manufacturer, driver liability coverage. Furthermore, the present invention also provides a holistic technical solution that covers the whole range from automotive control circuits and/or telematics devices and/or app installations to the automated and accurate risk measurement, analysis and management. Lastly, it is able to provide a dynamic, expert-system-based or machine learning-based scoring system based on real-time scoring and measurements, and furthermore provides a technically scalable solution based on scoring algorithms and data processing allowing to adapt the signaling to other fields of automated risk-transfer. The present invention, which is enhanced by contextual data, is able to provide best and highest optimized technical solution to the multi-tier risk-transfer system that is adapted in real-time. It allows one to capture and control the driver score behavior, and compare its behavior within the technical operation and context. It allows one to automatically capture risk scores according to location or trip, and to automatically analyze and react to data related to the need of value added services, such as for example, accident notifications and/or feedback to the driver and/or automated fleet risk reporting and/or automated and dynamically optimized underwriting etc.). As a variant, the score driving module can, for example, automatically capture scores risks according to measured maintenance (for example, maintenance failure by owner) and surveillance factor extracted from the automotive data associated with the motor vehicle or the use of active safety features. The telematics based feedback means of the system may, for example, comprise a dynamic alert feed via a data link to the motor vehicle's automotive control circuit, wherein the central, expert-system-based circuit heads up device alerts drivers immediately to a number of performance measures including, for example, high RPM, i.e. high revolutions per minute as a measure of the frequency of the motor rotation of the motor vehicle's engine, unsteady drive, unnecessary engine power, harsh acceleration, road anticipation, and/or ECO drive. The inventive telematics-based system provides the opportunities for real-time dynamic risk-adaption and improvement, i.e. as and when they happen, related to the motor vehicle's risk patterns (for example, location, speed, etc.). To provide instant feedback to drivers through heads up training aids and have information sent straight to the mobile telematics device, ensures a two pronged approach to correcting risky (and often expensive) driving habits. Thus, the automotive car system not only allows to mutually optimize the operational parameters of the first and second risk transfer system, but also optimizes the risk and/or risk behavior on the level of the risk exposed motor vehicles. No prior art system allows such an integral, real-time optimization. As another value added service, the telematics-based car system can, for example, dynamically generate risk reports of selected motor vehicles. Such reports, automatically generated by the telematics-based system, provide a new approach to sharing and comparing vehicles' statistics, which is one of the technical requirements that potential users of shared economy ridings or peer-to-peer car lendings are allowed to verify prior to use by a certain potential car sharer. The proposed invention with, for example, prefunding automotive enabled risk-transfer ((re)insurance) means will stimulate the carriers (first-tier risk-transfer systems) to provide its automotive data and claims' histories to the second-tier risk-transfer system in order to continually improve its scoring service, which in turn benefits carrier in helping reduce costs and combined ratio.

Lastly, the present invention further allows automated optimization of second risk-transfer systems by offering the aggregation system of the present invention, incl. the telematics devices and platform/scoring to first-risk-transfer systems, i.e. insurance systems, or OEMs for car sharing and sharing economy transportation risk-transfers and mobility insurance in exchange for re-insurance and data. The invention makes it possible to be operated on a completely automated basis, wherein a customer can, for example, download an aggregation application in order to get insurance coverage. Further, the invention makes it possible to provide automated motor reinsurance (second risk-transfer) capacity to sharing economy specialized insurance companies like Metromile (incl telematics)/SafeShare) or transportation companies such as Lyft/Uber in exchange for data and potentially scoring. The system can be realized, for example, in that the provider of the inventive system is in partnership with transportation sharing economy companies (incl. Uber, Metromile, SafeShare), thereby enabling insurance companies and OEMs to offer sharing economy risk solution/mobility insurance through an aggregation app. If the second risk-transfer system provides the inventive system, the second insurance system can also directly provide the scoring and reinsurance, with optimized second risk-transfer parameters. In this embodiment variant, the end user may firstly download the second risk-transfer labeled or white labeled mobile node application to perform insurance coverage for sharing economy related risks, especially related to vehicle sharing or transportation services, for example third-party insurance coverage due to ride-sharing risks incl. peer-to-peer lending risks, specifically MTPL (Motor Third Party Liability)/MOD (Motor Other Damages) if the car is borrowed or lent, or, personal damage (health/life) for third parties, when the user gives someone a lift and has an accident. In this case, the second risk-transfer system can, for example, offer a white labeled mobile node application for first risk-transfer systems, i.e. insurance systems, which allows issuance of quotes and policies through the mobile phone application, providing a score by means of the inventive system associated with the second risk-transfer system and data in return from the first risk-transfer systems, thereby providing second risk-transfer, i.e. reinsurance, capacity. Alternatively, the distribution could also be associated with and through the car manufacturer with its embedded devices or online portal. The measured and/or captured telematics data, for example, from the user's mobile application of vehicle usage is analysed by means of the inventive system to provide the scoring incl. ridesharing or car sharing information (for example, vehicle type, miles driven, number of people serviced/provided a lift, rental period of the car, potentially driving style, third party vehicle type, contextual data and score, individual score, AV/ADAS features score incl. level of automation, etc.) and then transferred to the automated first insurance system, i.e. the primary insurer, which generates a quote/coverage and policy based on the overall score obtained, the vehicle type and contextual data. Motor third party liability (MTPL) risk-transfer is typically legally-required compulsory liability insurance. All motor vehicles participating in road traffic and subject to registration in traffic must normally have valid MTPL insurance. Based on the motor third party liability risk-transfer, the first risk-transfer system will indemnify the traffic losses, created by the motor vehicle or user who caused the traffic accident, to the victim. Thus, MTPL risk-transfer gives the road user reliability that possible damage the user creates will be indemnified and that the user who caused the damage must not indemnify it himself. On the other hand, mandatory MTPL risk-transfer gives the victim confidence that the losses caused to him will be indemnified. Typically, MTPL risk-transfer works based on Motor Third Party Liability Risk-Transfer Regulations. Motor Other Damages (MOD) can for example comprise risk-transfer for (i) theft or robbery, as well as if the car parts are stolen because they are normally also automatically comprised in MOD, and (ii) damage comprising damages of a) in road traffic accidents and/or caused by fire, b) caused by forces of nature, c) caused by fallen objects and substances, d) third-party unlawful action, d) if the damage was caused by animals or birds, and/or e) breakage of the windscreen. However, it is important to note, that the inventive system is not limited to MTPL/MOD risk-transfer. The inventive system is able to provide an automated risk-transfer, covering all possible risks associated with shared economy schemes and/or peer-to-peer lending risks associated with motor vehicles, in particular all main related main risks as (i) accident risks, (ii) Motor Other Damages (MOD) risks, (iii) property risks, (iv) Motor Third-Party Liability (MTPL) risks, (v) General Third-Party Liability (GTPL) risks. In general, sharing economy risk-transfer and damage coverage comprises at least sharing economy transportation or car sharing/peer-to-peer lending related damages to Third Parties (for example if a user offers lift/transportation services to third parties or if a user borrows a car from a third party or a user lends a car of another user to a third party) against MTPL (for example accident), MOD (for example theft, hail), third party personal (health/life) risks and related risks (operator liability, product liability, cyber risks in case of autonomous vehicles etc.).

In one alternative embodiment, the central, expert-system-based circuit comprises a table with stored categorization trigger parameters for triggering a predefined level of scores, wherein the first and second risk transfer parameters and the correlated first and/or second payment transfer parameters are dynamically adapted and/or accumulated by means of the central, expert-system-based circuit based on the triggered categorization of the driving motor vehicles during usage and based upon the usage-based and/or user-based and/or operational automotive data captured from the plurality of driving motor vehicles. This embodiment has, inter alia, the advantage that it allows to provide new and unified approach for automated risk-transfer for risk associated with risk-exposed motor vehicles, considering dynamically measured, usage-based parameters, allowing a new optimization in the level of the risk-exposed vehicle as well as on the level of the operational pooling of risk-exposure of the first and/or second risk-transfer system.

In one alternative embodiment, the driving score module triggers and automatically selects score driving parameters based on defined score driving behavior pattern by comparing captured telematics data with the defined score driving behavior pattern. The score driving module can further for example automatically capture scores risks according to the measured location or trip of the motor vehicle based on the captured telematics data of the telematics devices associated with the motor vehicles. This alternative embodiment has, inter alia, the advantage that it allows to provide a real-time adapted multi-tier risk-transfer system. Further, it allows to capture and/or control the score driving behavior (also in the sense of location, time, road etc. of the driving), and compare its behavior within the technical operation and context. It allows to automatically capture score risks according to location or trip, and to automatically analyze and react on data related to the need of added services, as for example accident notifications).

In one alternative embodiment, the central, expert-system-based circuit comprises additional triggers triggering accident notification and/or other added services based on the captured telematics data of the telematics-based system for motor vehicle associated with the motor vehicles. This alternative embodiment has, inter alia, the advantage that the system is capable of providing additional benefit to the customer based on additionally generated signaling.

In another alternative embodiment, the switching device comprises capturing means for capturing a transfer of payment from the first insurance system to the second payment-transfer module, wherein the second layer trigger structure of the system is activatable by triggering a payment transfer matching a predefined activation threshold parameter. In another embodiment variant, in the case of triggering the occurrence of a loss associated with the occurrence of the defined risk events, a predefined defined portion of the occurred loss covered by the second insurance system based on the second risk transfer parameters and correlated second payment transfer parameters. Thus, the present invention can be realized with a proportional or a non-proportional risk-transfer as coupling mechanism between the first and second risk-transfer systems, wherein under proportional risk-transfer coupling, the second risk-transfer system is activated by means of the switching device by a fixed percentage share of each risk transferred to the first risk-transfer system respectively each loss transferred to the risk-transfer system. Accordingly, the second risk-transfer system receives that fixed payment transfer from the first risk-transfer system by means of the second payment parameters. Under non-proportional risk-transfer coupling, in case of triggering the exceedance of a defined activation threshold parameter associated with the occurrence of the defined risk events, the occurred loss is at least partly covered by the second insurance system based on the second risk transfer parameters and correlated second payment transfer parameters. The activation threshold can be associated with each single loss occurred or on the accumulated loss measured by means of the aggregated loss parameter. Thus, the non-proportional coupling can be realized in an excess of loss or stop loss risk-transfer structure, wherein the excess of loss structure can for example be based on a Per Risk XL (Working XL), Per Occurrence/Per Event XL (Catastrophe or Cat XL), or Aggregate XL structure. As a more particular alternative embodiment, a periodic payment transfers from the risk exposure components to the resource pooling system via a plurality of payment receiving modules is requested by means of a monitoring module of the resource-pooling system, wherein the risk transfer or protection for the risk exposure components is interrupted by the monitoring module, when the periodic transfer is no longer detectable via the monitoring module. As an alternative, the periodic payment transfer request can be interrupted automatically or waived by the monitoring module, when the occurrence of indicators for a risk event is triggered in the data flow pathway of a risk exposure component. These alternative embodiments have, inter alia, the advantage that the system allows for further automation of the monitoring operation, especially of its operation with regard to the pooled resources.

In another alternative embodiment, an independent verification risk event trigger of the first and/or second resource pooling system is activated in cases when the occurrence of indicators for a risk event is triggered in the data flow pathway of the vehicle embedded or mobile network node integrated telematics devices or the central, expert-system-based circuit by means of the risk event triggers, and wherein the independent verification risk event trigger additionally issues a trigger in the event of the occurrence of indicators regarding risk events in an alternative data flow pathway with independent measuring parameters from the primary data flow pathway, for example of alternative telematics devices, in order to verify the occurrence of the risk events at the risk exposed automotive motor vehicles. In this alternative, the transfer of payments is only assigned to the corresponding risk exposed motor vehicle if the occurrence of the risk event at the risk exposure component is verified by the independent verification risk event trigger. These alternative embodiments have, inter alia, the advantage that the operational and financial stability of the system can thus be improved. In addition, the system is rendered less vulnerable to fraud and counterfeit.

In general, the system can for example comprise capturing means that capture a payment transfer assigned to one of the two risk transfer systems, for example also from the first insurance system to the second payment transfer module, wherein the assigned insurance system is activated, and wherein the risk exposure of the first insurance system associated with the assigned risk transfer layer is transferred to the second insurance system. This alternative embodiment has, inter alia, the advantage that additionally the second insurance system distinctively can be activated, allowing a controlled and discrete risk transfer and risk cover from the first to the second resource pooling system.

In another alternative embodiment, the first insurance system comprises an interface module for accessing and adapting the assigned operational parameters prior to the transfer of the payment parameters from the first resource pooling system to the second resource pooling system. This alternative embodiment has, inter alia, the advantage that the risk transfer structure can be dynamically adjusted and, moreover, selected and/or additionally optimized directly by the first insurance system or the second insurance system.

In still another alternative embodiment, the central, expert-system-based circuit comprises means for processing risk-related driving motor vehicle data and for providing data regarding the likelihood of said risk exposure for one or a plurality of the pooled risk exposed motor vehicle, in particular, based on the risk-related motor vehicle data, and wherein the receipt and preconditioned storage of payments from the risk exposed motor vehicles for the pooling of their risks can be dynamically determined based on the total risk and/or the likelihood of risk exposure of the pooled risk-exposed motor vehicles. This alternative embodiment has, inter alia, the advantage that the operation of the first and/or second resource pooling system can be dynamically adjusted to changing conditions in relation to the pooled risk, such as a change of the environmental conditions or risk distribution, or the like, of the pooled motor vehicles. A further advantage is that the system does not require any manual adjustments, when it is operated in different environments, places or countries, because the size of the payments of the risk exposed motor vehicles is directly related to the total pooled risk. However, it is important to note, that the present invention does not necessarily have to lead to adjusted pricing or premiums. For example, it could also automatically provide coupons to automated motor vehicles driving in low risk regions, or that nothing at all changes but that the system uses the automotive data to automatically decide if the risk-transfer is continued the next year. The present invention can also exclusively be used for automatically providing and activating adapted and/or specifically selected value added services, as for example accident notifications and/or feedback to the motor vehicle or driver and/or automated fleet risk reporting and/or automated and dynamically optimized underwriting etc. Thus, the present invention allows an adaption of the risk of the first risk-transfer tier or system as well as risk on level of the insured motor vehicles (for example by risk-based driver feedback in real-time) and/or the second risk-transfer tier or system. There is no prior art system, allowing such an optimization and/or adaption. The feedback can for example be generated by comparing the motor vehicle's profile and pattern with other motor vehicle's profiles or pattern at the same location and/or comparable conditions.

In one alternative embodiment, the system comprises means for processing risk-related component data and for providing information regarding the likelihood of said risk exposure for one or a plurality of the pooled risk exposed motor vehicles, in particular, based on risk-related motor vehicles' data, and wherein the receipt and preconditioned storage of payments from the first resource pooling system to the second resource pooling system for the transfer of its risk can be dynamically determined based on the total risk and/or the likelihood of risk exposure of the pooled risk exposure components. This alternative embodiment has, inter alia, the advantage that the operation of the first and/or second resource pooling system can be dynamically adjusted to changing conditions of the pooled risk, such as changes of the environmental conditions or risk distribution, or the like, of the pooled risk components. A further advantage is the fact that the system does not require any manual adjustments, when it is operated in different environments, places or countries, because the size of the payments of the risk exposure components is directly related to the total pooled risk.

In one alternative embodiment, the number of pooled motor vehicles is dynamically adjusted via the first risk-transfer system to a range where non-covariant, occurring risks covered by the risk-transfer system affect only a relatively small proportion of the total pooled risk exposure components at any given time. Analogously, the second risk-transfer system can for example dynamically adjust the number of pooled risk shares transferred from first risk-transfer systems to a range where non-covariant, occurring risks covered by the second risk-transfer system affect only a relatively small proportion of the total pooled risk transfers from first risk-transfer systems at any given time. This variant has, inter alia, the advantage that the operational and financial stability of the system can be improved.

In one alternative embodiment, the risk event triggers are dynamically adjusted by means of an operating module based on time-correlated incidence data for one or a plurality of the predefined risk events. This alternative embodiment has, inter alia, the advantage that improvements in capturing risk events or avoiding the occurrence of such events, for example by improved forecasting systems, etc., can be dynamically captured by the system and dynamically affect the overall operation of the system based on the total risk of the pooled risk exposure components.

In another alternative embodiment, upon each triggering of an occurrence, where parameters indicating a predefined risk event are measured, by means of at least one risk event trigger, a total parametric payment is allocated with the triggering, and wherein the total allocated payment is transferrable upon a triggering of the occurrence. The predefined total payments can for example be leveled to any appropriate defined total sum, such as a predefined value, or any other sum related to the total transferred risk and the amount of the periodic payments of the risk exposed motor vehicle. This alternative has, inter alia, the advantage that the parametric payments or the payments of predefined amounts can be relied on fixed amounts. Further, the parametric payment may allow for an adjusted payment of the total sum that can for example be dependent on the stage of the occurrence of a risk event, as triggered by the system.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
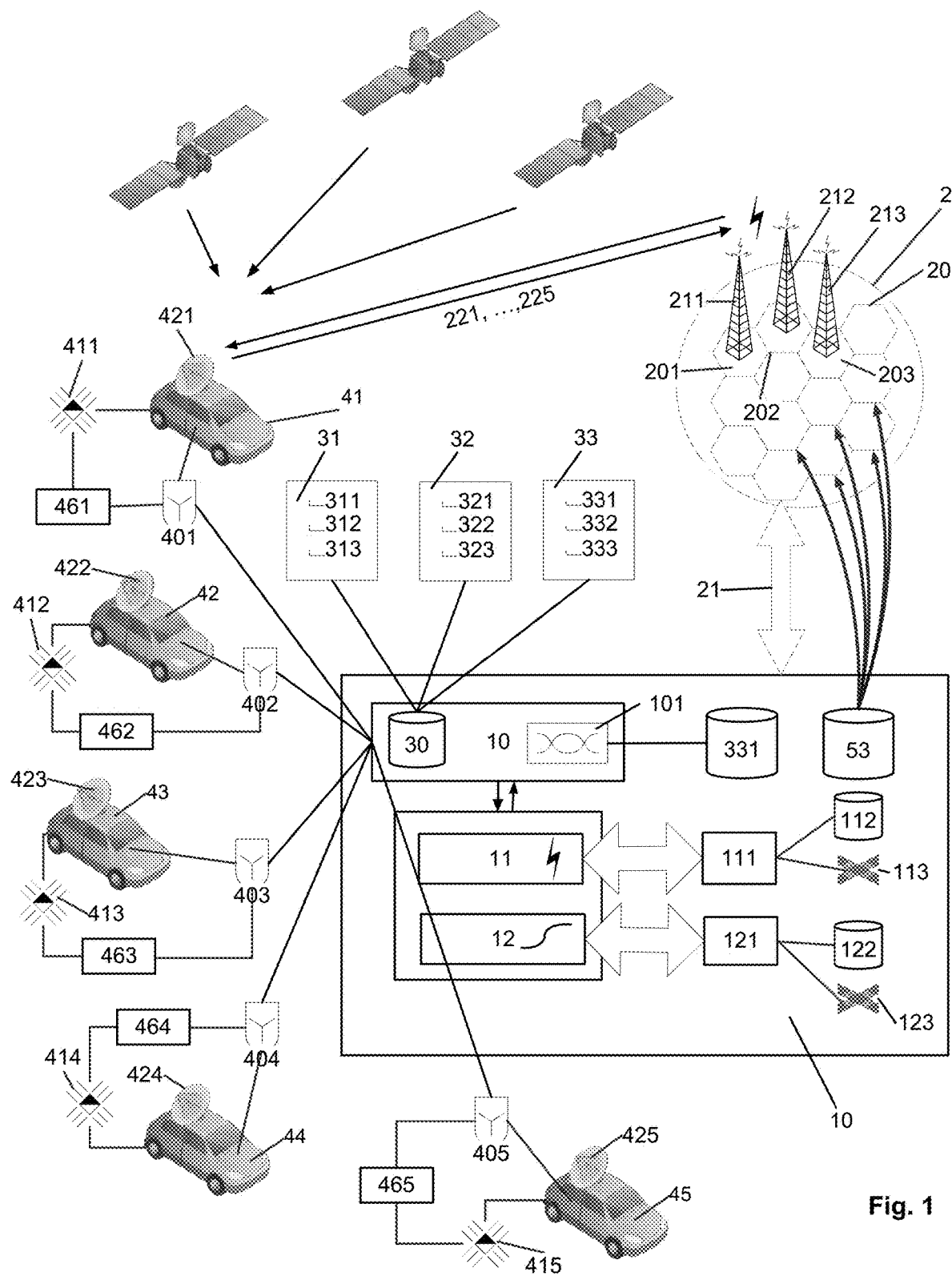
FIG. 1 shows a block diagram schematically illustrating an exemplary OEM-linked, telematics-based system and platform 1 for score-driven operations associated with motor vehicles 41, ..., 45 or transportation means of passengers or goods. The telematics-based system 1 comprises telematics devices 411, ..., 415 associated with the plurality of motor vehicles 41, ..., 45. The telematics devices 411, ..., 415 are connected via the interfaces 421, ..., 425 to the sensors and/or measuring devices 401, ..., 405 and/or an on-board diagnostic system 431, ..., 435 and/or an in-car interactive device 441, ..., 445, and wherein the telematics devices 411, ..., 415 capture usage-based 31 and/or user-based 32 and/or operational 33 telematics data 3 of the motor vehicle 41, ..., 45 and/or user 321, 322, 323.
Figure 2:
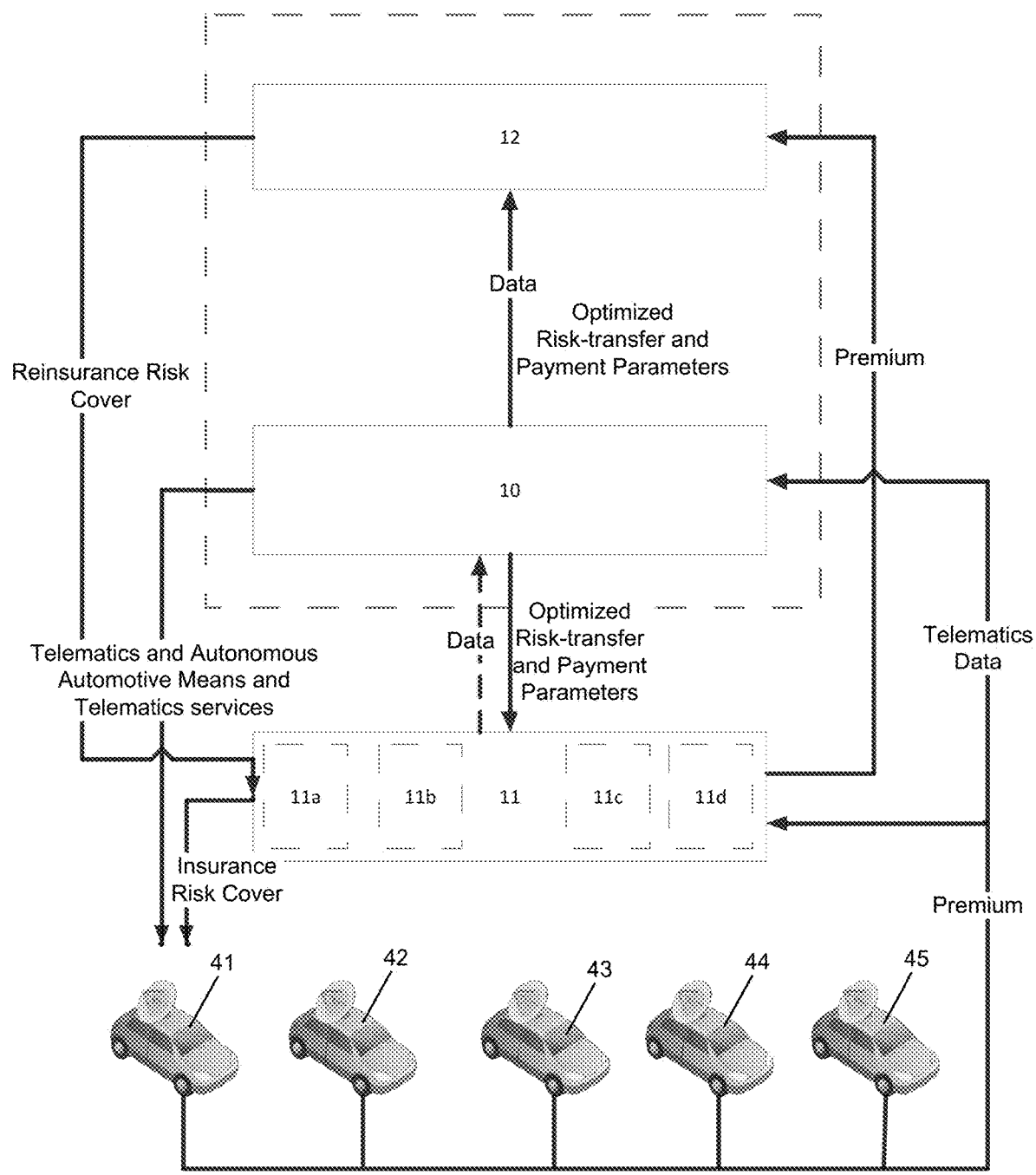
FIG. 2 shows a block diagram schematically illustrating operational flow and processing steps according to an embodiment of the present invention for example according to FIG. 1.
Figure 3:
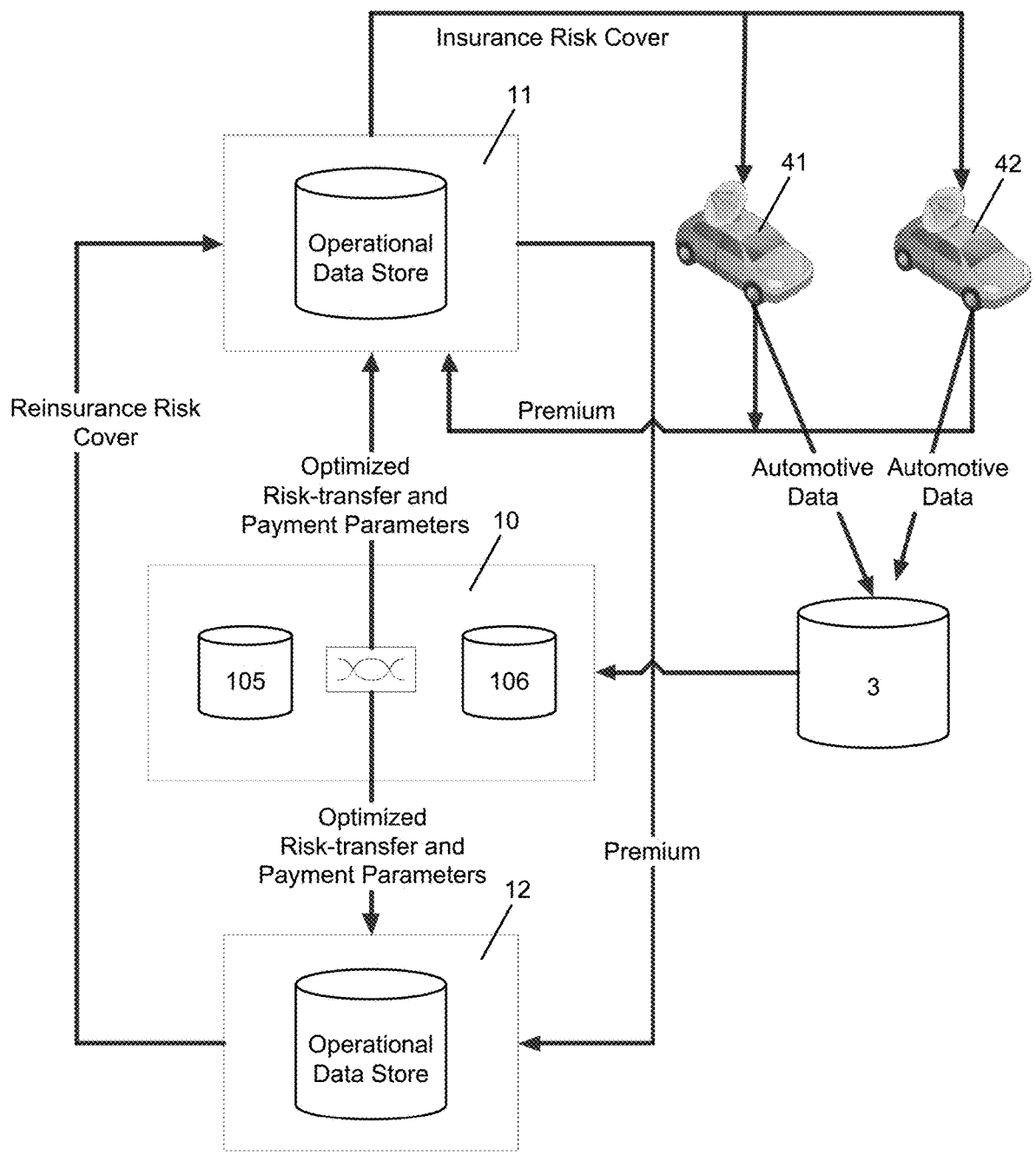
FIG. 3 shows another block diagram schematically illustrating an exemplary automated, telematics-based system 1 for triggering score-driven operations associated with motor vehicles 41, ..., 45 or transportation means of passengers or goods. The telematics-based system 1 comprises telematics devices 411, ..., 415 associated with the plurality of motor vehicles 41, ..., 45. The telematics devices 411, ..., 415 are connected via the interfaces 421, ..., 425 to the sensors and/or measuring devices 401, ..., 405 and/or an on-board diagnostic system 431, ..., 435 and/or an in-car interactive device 441, ..., 445, and wherein the telematics devices 411, ..., 415 capture usage-based 31 and/or user-based 32 and/or operational 33 telematics data 3 of the motor vehicle 41, ..., 45 and/or user 321, 322, 323. The system 1 is capable of capturing different kinds of telematics data 3, as also for example driving behavior from the user and/or whether the motor vehicle 41, ..., 45 is driving itself (auto piloting) and/or the motor vehicle 41, ..., 45 is intervening with its automated or safety features. The latter is possible, if the central, expert-system-based circuit 10 capture data 3 from the motor vehicle 41, ..., 45 itself. The telematics devices can generate data 3 themselves by means of sensors of the motor vehicles' systems, for example provided by an on-board diagnostic system. As seen from FIG. 2, the central, expert-system-based circuit 10 is realized as a separate part of the automated, telematics-based system 1, or as a part of the second risk-transfer system 12, wherein in the latter case, the scoring data can be provided by the second risk-transfer system 12 to the first risk-transfer system 12 and/or the risk exposed motor vehicles 41, ..., 45, in exchange of having access to the captured telematics data 3 and/or captured claim or loss data 711, ..., 715/721, ..., 725/731, ..., 735. As also illustrated by FIG. 2, the automated, telematics-based system 1 may comprise one first risk-transfer system 11 or a plurality of first risk-transfer systems 11a-11d, all associated with the same second risk-transfer system 12.
Figure 4:
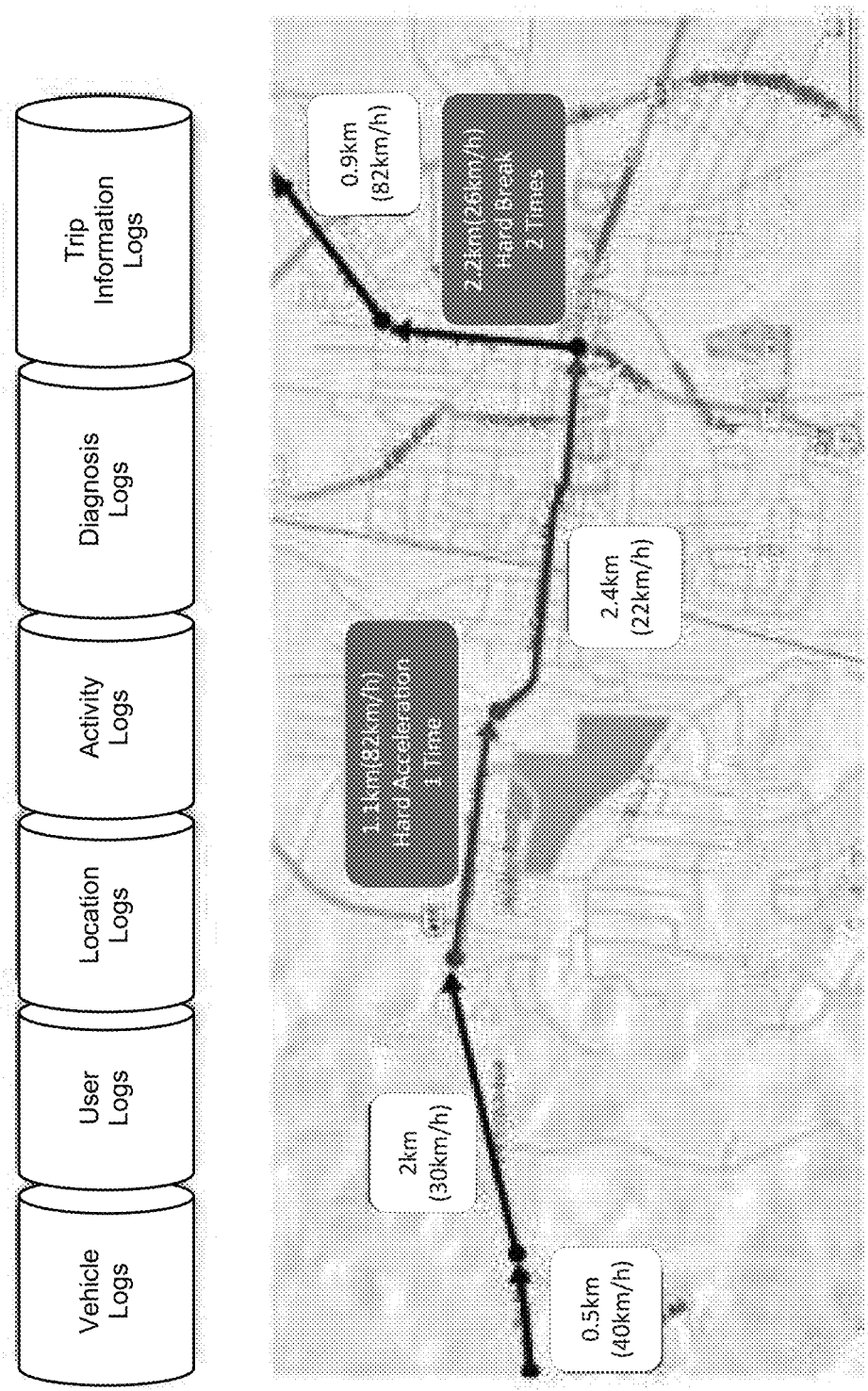
FIG. 4 shows another block diagram schematically illustrating an exemplary dynamically adaptable automotive car system 1 with telematics devices 411, ..., 415 associated with a plurality of risk-exposed motor vehicles 41, ..., 45, according an embodiment variant of the invention. In particular, it shows a central, expert-system-based circuit 10. The telematics devices 411, ..., 415 capture usage-based 31 and/or user-based 32 telematics data 3 of the motor vehicle 41, ..., 45 and/or user 321, 322, 323, and transmit them via the data transmission network 2 to the central, expert-system-based circuit 10, which cooperates the coupled first and second risk-transfer systems 11/12.
Figure 5:
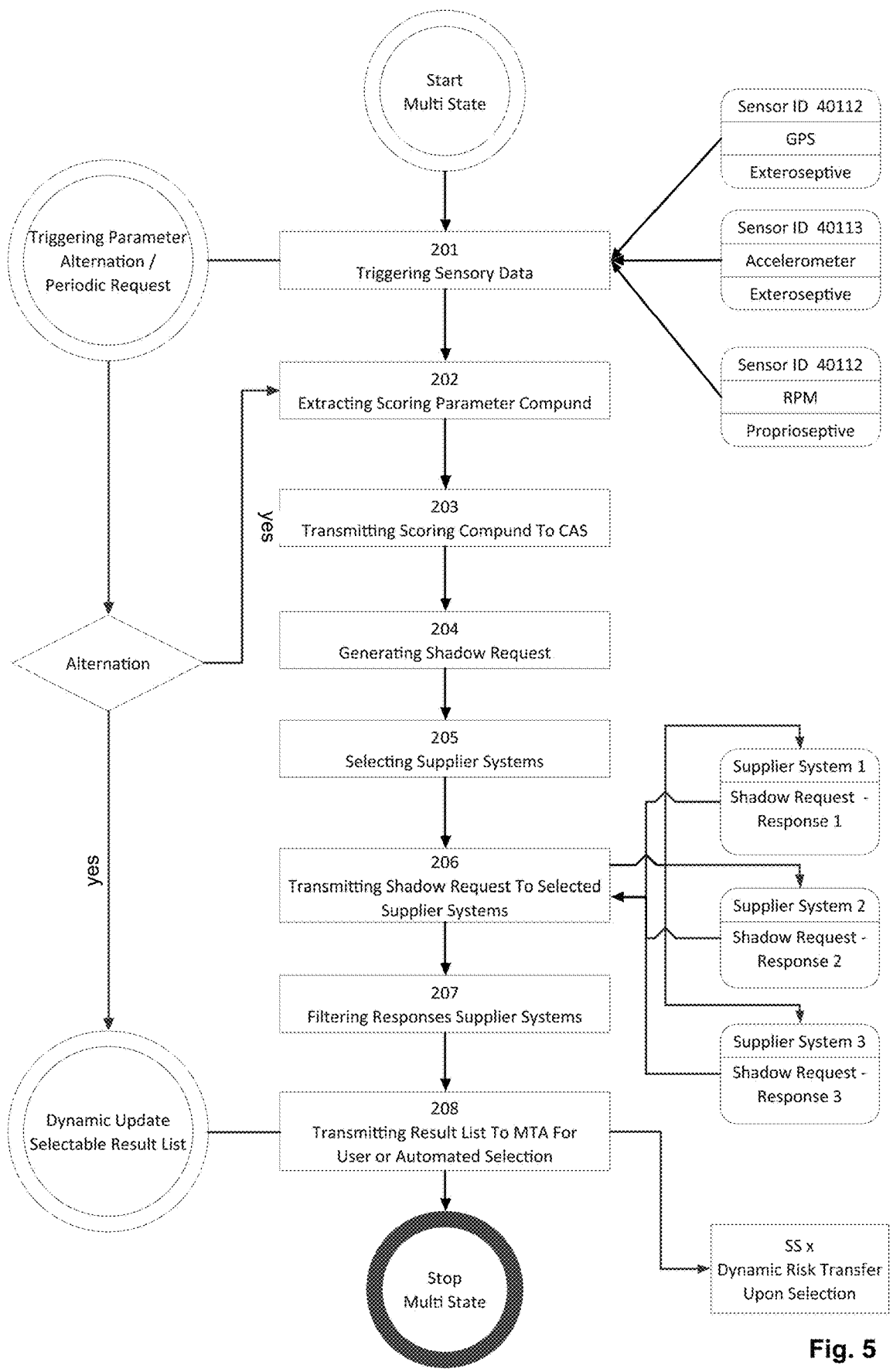
FIG. 5 shows a block diagram schematically illustrating exemplary telematics devices 411, ..., 415 and real-time telematics data capturing.

FIG. 1 schematically illustrates an architecture for a possible implementation of an embodiment of the automated, telematics-based system 1 for electronically triggering score-driven operations associated with motor vehicles 41, . . . , 45 or transportation means of passengers or goods, in particularly providing a dynamic, telematics-based system 1 and telematics data aggregator by means of a central, expert-system-based circuit 10 and telematics devices (411, . . . , 415. The automated, telematics-based system 1 reacts in real-time, dynamically on captured environmental or operational parameters 3, in particular on monitored and captured automotive parameters 3 of motor vehicles 41, . . . , 45 during operation. The present invention further is able to provide a telematics based automated risk-transfer, alert and real-time notification systems for motor vehicles 41, . . . , 45 and wireless technology used in the context of telematics. Finally, the present system 1 also provides to telematics-based real-time expert systems. Thus, the inventive system 1 provides a structure for the use of telematics together with real-time risk-monitoring, automated risk-transfer and insurance systems based on captured and measured usage-based and/or user-based telematics data 3.

To provide the dynamic, automated, telematics-based system 1, the telematics-based system 1 captures and categorizes risk-transfer profiles 114 in a result list 108, wherein the result list 108 is provided for display and selection to a user of the motor vehicle 41, . . . , 45 via an interface of the user unit 461, . . . , 465, which can for example be a mobile telecommunication node, as for example a smart phone by a mobile phone application, and/or the dashboard of the car somehow connected to the user unit 461, . . . , 465 or another interface of the motor vehicle 41, . . . , 45 by means of the central, expert-system-based circuit 10.

The telematics devices 411, . . . , 415 comprises one or more data transmission connection to on-board sensors and measuring devices 401, . . . , 405 of the motor vehicle 41, . . . , 45 and/or an on-board diagnostic system 431, . . . , 435 and/or an in-car interactive device 441, . . . , 445 of a motor vehicle 41, . . . , 45. The telematics devices 411, . . . , 415 can also be accessible by a user unit 461, . . . , 465 of a mobile phone node or be an integrated part of the mobile phone node. The on-board sensors and measuring devices 401, . . . , 405 and/or the on-board diagnostic system 431, . . . , 435 and/or the in-car interactive device 441, . . . , 445 comprises proprioceptive sensors 4021 for sensing operating parameters 40121 of the motor vehicle 41, . . . , 45 and/or exteroceptive sensors 4011 for sensing environmental parameters 40111 during operation of the motor vehicle 41, . . . , 45. The exteroceptive sensors or measuring devices 4011 can, for example, comprise at least radar devices 40117 for monitoring surrounding of the motor vehicle 41, . . . , 45 and/or LIDAR devices 40115 for monitoring surrounding of the motor vehicle 41, . . . , 45 and/or global positioning systems 40122 or vehicle tracking devices for measuring positioning parameters of the motor vehicle 41, . . . , 45 and/or odometrical devices 40114 for complementing and improving the positioning parameters measured by the global positioning systems 40112 or vehicle tracking devices and/or computer vision devices 40116 or video cameras for monitoring the surrounding of the motor vehicle 41, . . . , 45 and/or ultrasonic sensors 40113 for measuring the position of objects close to the motor vehicle 41, . . . , 45. The proprioceptive sensors or measuring devices 4012 for sensing operating parameters 40121 of the motor vehicles 41, . . . , 45 can at least comprise motor speed and/or wheel load and/or heading and/or battery status of the motor vehicles 41, . . . , 45. The one or more wireless connections 4210 or wired connections 4211 of the telematics devices 411, . . . , 415 can for example comprise Bluetooth (IEEE 802.15.1) or Bluetooth LE (Low Energy) 42101 as wireless connection for exchanging data using short-wavelength UHF (Ultra high frequency) radio waves in the ISM (industrial, scientific and medical) radio band from 2.4 to 2.485 GHz by building a personal area networks (PAN) with the on-board Bluetooth capabilities and/or 3G and/or 4G and/or GPS and/or Bluetooth LE (Low Energy) and/or BT based on Wi-Fi 802.11 standard, and/or a contactless or contact smart card, and/or a SD card (Secure Digital Memory Card) or another interchangeable non-volatile memory card.

For providing the wireless connection 4210, the telematics devices 411, . . . , 415 can for example act as wireless node within a corresponding data transmission network by means of antenna connections of the telematics devices 411, . . . , 415, in particular, as mentioned, mobile telecommunication networks as for example 3G, 4G, 5G LTE (Long-Term Evolution) networks or mobile WiMAX or other GSM/EDGE and UMTS/HSPA based network technologies etc., and more particular with appropriate identification means as SIM (Subscriber Identity Module) etc. The telematics devices 411, . . . , 415 can for example be connected to an on-board diagnostic system 431, . . . , 435 and/or an in-car interactive device 441, . . . , 445, wherein the telematics devices 411, . . . , 415 capture usage-based 31 and/or user-based 32 automotive data 3 of the motor vehicle 41, . . . , 45 and/or user. The telematics devices 411, . . . , 415 can for example provide the one or more wireless connections 4210 by means radio data systems (RDS) modules and/or positioning system including a satellite receiving module and/or a mobile cellular phone module including a digital radio service module and/or a language unit in communication the radio data system or the positioning system or the cellular telephone module. The satellite receiving module can for example comprise a Global Positioning System (GPS) circuit and/or the digital radio service module comprises at least a Global System for Mobile Communications (GSM) unit. The plurality of interfaces of the mobile telecommunication apparatus 10 for connection with at least one of a motor vehicle's data transmission bus can for example comprise at least on interface for connection with a motor vehicle's Controller Area Network (CAN) bus, for example in connection with on-board diagnostics (OBD) port, or other connection for example for battery installed devices, or also OEM (Original Equipment Manufacturer) installed systems getting information access to on-board sensors or entertainment systems (as for example Apple Carplay etc.) providing the necessary vehicle sensor information. The measured operating parameters 40121 and/or environmental parameters 40111 during operation of the motor vehicle 41, . . . , 45 can for example comprise time-dependent speed measuring, hard breaking, acceleration, cornering, distance, mileage (PAYD), short journey, time of day, road and terrain type, mobile phone usage (while driving), weather/driving conditions, location, temperature, blind spot, local driving, sun angle and dazzling sun information (sun shining in drivers' face), seatbelt status, rush hour, fatigue, driver confidence, throttle position, lane changing, fuel consumption, VIN (vehicle identification number), slalom, excessive RPM (Revolutions Per Minute), off road, G forces, brake pedal position, driver alertness, CAN (Controller Area Network) bus (vehicle's bus) parameters including fuel level, distance to other vehicles, distance to obstacles, driver alertness, activated/usage of automated features, activated/usage of Advanced Driver Assistance Systems, traction control data, usage of headlights and other lights, usage of blinkers, vehicle weight, amount of vehicle passengers, traffic sign information, junctions crossed, jumping of orange and red traffic lights, alcohol level detection devices, drug detection devices, driver distraction sensors, driver aggressiveness, driver mental and emotional condition, dazzling headlights from other vehicles, vehicle door status (open/closed), visibility through windscreens, lane position, lane choice, vehicle safety, driver mood, and/or passengers' mood. Up-to-now, no prior art system is able to process such a variety of dynamic-monitored, risk-relevant data. The advantage of the generated score parameters mirrors the captured sensory data in that the data components of the score can even for example comprise: customer policy details, individual driving data, crash forensics data, credit scores, statistical driving data, historic claims data, market databases, driving license points, statistical claims data, context data of weather or road type or surrounding.

The central, expert-system-based circuit 10 comprises a vehicle-telematics driven core aggregator 100 with telematics data-based triggers 1001 triggering, capturing, and monitoring in the dataflow pathway 451, . . . , 455 of the sensors 401, . . . , 405 and/or the on-board diagnostic system 431, . . . , 435 and/or the in-car interactive device 441, . . . , 445 of the motor vehicle 41, . . . , 45 said operating parameters 40121 and/or environmental parameters 40111 during operation of the motor vehicle 41, . . . , 45. The telematics devices 411, . . . , 415 can for example comprise at least a GPS module (Global Positioning System) and/or geological compass module based on a 3-axis teslameter and a 3-axis accelerometer, and/or gyrosensor or gyrometer, and/or a MEMS accelerometer sensor comprising a consisting of a cantilever beam with the seismic mass as a proof mass measuring the proper or g-force acceleration, and/or a MEMS magnetometer or a magnetoresistive permalloy sensor or another three-axis magnetometers.

The central, expert-system-based circuit 10 comprises a driving score module 101 measuring and/or generating a single or a compound set of variable scoring parameters 1011, . . . , 1013 profiling the use and/or style and/or environmental condition of driving during operation of the motor vehicle 41, . . . , 45 based upon the triggered, captured, and monitored operating parameters 40111 or environmental parameters 40121. Thus, system 1 scores individual drivers based on the monitored operating parameters 40111 or environmental parameters 40121. Based on the score and/or other relevant telematics data visible to consumers and the risk-transfer provider (insurers) (if consumer agrees), the first risk-transfer systems 10 are able to quote. The single or compound set of variable scoring parameters 1011, . . . , 1013 are profiling the use and/or style and/or environmental condition of driving during operation of the motor vehicle 41, . . . , 45 and can be for example measured and/or generated by means of the driving score module 101 based upon the captured, triggered and monitored risk-related usage-based 31 and/or user-based 32 and/or operational 33 telematics data 3. The variable scoring parameters 1011, . . . , 1013 at least comprise scoring parameters measuring a driver score measuring behavioral parameters of the driver, and/or a contextual score comprising at least number of intersections and/or road type, and/or a vehicle safety score comprising at least activated ADAS/AV features of the motor vehicle 41, . . . , 45, and/or a mobility score comprising at least lending period and/or number of passengers. As sub-score, the scoring parameters of the mobility score can further comprise a trustworthiness score comprising at least a care of assets score, and/or a peer-to-peer lending score, and/or a car sharing score, and/or a transportation services risk score, and/or a trustworthiness score and/or a vehicle type score. Thus, the scoring parameter can, for example, further comprise a trustworthiness score comprising at least a care of assets score, and/or a peer-to-peer lending score, and/or a car sharing score, and/or a transportation services risk score, and/or a trustworthiness score and/or a vehicle type score. For the driving score, the contextual score and the vehicle safety score, (i) the variable driving scoring parameter is at least based upon a measure of driver behavior parameters comprising speed and/or acceleration and/or braking and/or cornering and/or jerking, and/or a measure of distraction parameters comprising mobile phone usage while driving and/or a measure of fatigue parameters and/or drug use parameters, (ii) the variable contextual scoring parameter is at least based upon measured trip score parameters based on road type and/or number of intersection and/or tunnels and/or elevation, and/or measured time of travel parameters, and/or measured weather parameters and/or measured location parameters, and/or measured distance driven parameters, and (iii) the variable vehicle safety scoring parameter is at least based upon measured ADAS feature activation parameters and/or measured vehicle crash test rating parameters and/or measured level of automation parameters of the motor vehicle 41, . . . , 45 and/or measured software risk scores parameters. This innovation makes it possible to link all main contributors of accidents to risk relevant data points and risk drivers for scoring and risk measuring/assessment technical objects. By means of the CAN-BUS or TCU (Telematics control unit) data of the vehicle, the scoring and risk measurement/assessment can be achieved more accurately and in more precise manner for end consumers leading to an improved and optimized client centric experience and risk selection. Measuring the main contributors, they can for example be given on the example of main contributors to accidents in USA as follows: (1) Distracted driving, (2) Speeding, (3) Drunk driving, (4) Reckless driving, (5) Rain, (6) Running red lights, (7) Running stop signs, (8) Teenage drivers, (9) Night driving, (10) Car design effects. A data link 21 is set by means of the wireless connection 4210 of the telematics devices 411, . . . , 415 over a mobile telecommunication network 2 between the telematics devices 411, . . . , 415 as client and the central, expert-system-based circuit 10. The mobile telematics devices 411, . . . , 415 act as wireless node 221, . . . , 225 within said mobile telecommunication network 2. The central expert-system-based circuit 10 automatically generates said single or set compound of variable scoring parameters.

In summary, the telematics data for example from the end user's mobile node application of vehicle usage is analysed to provide a scoring on ridesharing an peer-to-peer lending parameters (incl vehicle type, miles driven, number of people serviced/provided a lift, rental period of the car, potentially driving style, third party vehicle type, contextual data and score, individual score, trustworthiness score based on past lending activities, creditscore, AV/ADAS features score incl level of automation, peer-to-peer/carsharing lending score, etc.) and then transferred to associated first insurance systems which generate a quote and policies based on the overall score obtained, the vehicle type and contextual data. For the technical risk-transfer handling, the system 1 can for example comprise two modules, (i) a car sharing/Peer-to-peer lending risk module and (ii) a sharing economy transportation risk module related to third parties for scoring. This positions the provider of the inventive system 1 for mobility risks as a service risk-transfer provider. Further the risk-transfer handling comprises the aggregation system for peer-to-peer lending/car sharing/sharing economy transportation services risk-transfer. And finally, the system 1 the automated and telematics-based risk-transfer platform and systems for peer-to-peer lending risk-transfer and sharing economy transportation risk (that allows fully automated risk-transfer and insurance incl. policy issuing, claims handling etc.). The latter may for example also be provided by an associated third party system. Distribution of the solution can for example be performed through a) sharing economy provider or b) first insurance systems (i.e. primary insurance) through a smart phone (aggregator) application and/or through c) car manufacturer (for example OEMs) with embedded devices for example infotainment system/dashboard. The present inventive system 1 can, for example, further offer added value services to the end-users or policyholders and/or scoring services based upon the three generated main scores: (1) a mobility score, (miles, number of people), (2) contextual score, (3) vehicle safety score, and potentially (4) driving score.

A shadow request 109 is transmitted to a plurality of automated first risk-transfer systems 11, decentrally connected to the central, expert-system-based circuit 10 over a data transmission network. The shadow request 109 comprises at least risk-relevant parameters based upon the measured and/or generated single or compound set of variable scoring parameters 1011, . . . , 1013. The central, expert-system-based circuit 10 receives in response to the emitted shadow request 109 a plurality of individualized risk-transfer profiles 114 based upon the dynamically collected single or compound set of variable scoring parameters 1011, . . . , 1013. The risk-relevant parameters of the shadow request 109 comprise at least usage-based 31 and/or user-based 32 and/or operating 33 telematics data 3 measured and/or generated by the telematics devices 411, . . . , 415 based upon the triggered, captured, and monitored operating parameters 40111 or environmental parameters 40121, and the generated single or set compound of variable scoring parameters 1011, . . . , 1013. The shadow requests 109 can for example be periodically transmitted to the plurality of automated first risk-transfer systems 11 based on the dynamically generated single or compound set of variable scoring parameters 1011, . . . , 1013 and/or the triggered, captured, and monitored operating parameters 40111 or environmental parameters 40121. A result list 108 can be dynamically adapted in real-time and displayed to the user for selection via the user unit 461, . . . , 465 or the mobile phone by means the mobile phone application or another interactive device of the motor vehicles 41, . . . 45. However, the shadow requests 109 can also be generated and transmitted to the plurality of automated first risk-transfer systems 11 based on the dynamically generated single or compound set of variable scoring parameters 1011, . . . , 1013 and/or the triggered, captured, and monitored operating parameters 40111 or environmental parameters 40121, if the central, expert-system-based circuit 10 triggers an alternation of the dynamically generated single or compound set of variable scoring parameters 1011, . . . , 1013 and/or the triggered, captured, and monitored operating parameters 40111 or environmental parameters 40121. The result list 108 can be dynamically adapted in real-time and displayed to the user for selection. As embodiment variant, also a combination of the two before mentioned shadow request generations may be applied.

The central, expert-system-based circuit 10 dynamically captured and categorized the received plurality of individualized risk-transfer profiles 114 of the automated first risk-transfer systems 11. The result list 108 can be dynamically updated and provided for display and selection to the user of the motor vehicle 41, . . . , 45 by means of the user unit 461, . . . , 465 based upon the triggered, captured, and monitored operating parameters 40121 or environmental parameters 40111 during operation of the motor vehicle 41, . . . , 45. Therefore, the plurality of individualized risk-transfer profiles 114, provided by the automated first risk-transfer systems 11, time-dependently vary based on the generated single or compound set of variable scoring parameters 1011, . . . , 1013 measuring the time-dependent use and/or style and/or environmental condition of driving during operation of the motor vehicle 41, . . . , 45. The mobile automotive system 1 can for example automatically alert the user, if a more preferable risk-transfer profile 114 is triggered in relation to a before selected risk-transfer profile 114. Further, the telematics-based system 1 can also automatically adapt a risk-transfer associated with a user or motor vehicle 41, . . . , 45, if a more preferable risk-transfer profile 114 is triggered in relation to a selected risk-transfer profile 114. The result list 108 can dynamically be adapted in real-time and displayed to the user for selection based upon definable categorization criteria as for example first payment parameters 1121, . . . , 1125 and/or duration and/or risk-transfer structure.

LIST OF REFERENCE SIGNS

1 Telematics-based system
  10 Central, expert-system-based circuit
    100 Vehicle-operation driven core aggregator
      1001 Telematics data-driven triggers
      1002 Additional trigger triggering accident notification
      1003 Additional trigger triggering added services
    101 Driving score module
      1011, . . . , 1013 Compound set of variable scoring parameters
      1021, . . . , 1023 Defined scores driving behavior pattern
    102 Additional trigger triggering accident notification
    103 Additional trigger triggering added services
    104 Aggregation module
      1041 Predefined time period
    105 Database with historical data
    106 Automated database with location-depended data
    107 Switching device
    108 Dynamic result listing
    109 Shadow request
  11 First risk-transfer systems
    111 Automated resource pooling system
    112 First data store
      1121, . . . , 1125 First payment parameters
    113 First payment transfer modules
    114 Generated risk transfer profiles
  12 Second risk-transfer system
    121 Automated resource pooling system
    122 Second data store
      1221, . . . , 1225 Second payment parameters
    123 Second payment transfer modules
      1231 Control device
      1232 Activation control parameter
    124 Activation threshold parameter
    125 Predefined loss covering portion 2 Data transmission network
  20 Cellular network grid
    201, ..., 203 Network cell/Basic service area
    211, ..., 213 Base (transceiver) station
      2111, ..., 2131 Cell Global Identity (CGI)
    221, ..., 225 Mobile network nodes
  21 Uni- or bidirectional data link
3 Telematics data
  31 Usage-based telematics data
    311, ..., 313 Usage-based telematics data of the vehicles 41, ..., 45
  32 User-based telematics data
    321, ..., 323 User-based telematics data of the vehicles 41, ..., 45
  33 Operational telematics data
    331, ..., 333 Operational data of the control system 461, ..., 465
41, ..., 45 Motor vehicles
  401, ..., 405 On-board sensors and measuring devices
    4011 Exteroceptive sensors or measuring devices
      40111 Sensory data of the exteroceptive sensors
      40112 Global Positioning System (GPS)
      40113 Ultrasonic sensors
      40114 Odometry sensors
      40115 LIDAR (light detection and ranging)
      40116 Video cameras
      40117 Radar Sensors
    4012 Proprioceptive sensors or measuring devices
      40121 Sensory data of the proprioceptive sensors
  411, ..., 415 Telematics devices
  421, ..., 425 Data transmission bus interface
    4210 Wireless connections
      42101 Bluetooth (IEEE 802.15.1) or Bluetooth LE (Low Energy)
      42102 Wi-Fi (IEEE 802.11)
      42103 GSM (Global System for Mobile Communication)
      42104 GPRS (General Packet Radio Service)
      42105 3G or 4G network (third/fourth generation network)
      42106 WiMAX (Worldwide Interoperability for Microwave Access)
      42107 CDMA/CDMA2000 (Code Division Multiple Access)
      42108 EDGE (Enhanced Data Rates for GSM Evolution)
    4211 Wired connections
      42111 Ethernet (IEEE 802.11)
      42112 ARCNET (Attached Resource Computer Network)
      42113 FDDI (Fiber Distributed Data Interface)
  431, ..., 435 On-board diagnostic system
  441, ..., 445 In-car interactive device
  451, ..., 455 Dataflow pathway
  461, ..., 465 User unit
5 Aggregated risk exposure
  51, ..., 55 Transferred risk exposures of the motor vehicles
    501, ..., 505 First risk transfer parameters
    511, ..., 515 Second risk transfer parameters
6 Predefined risk events
  61 Predefined risk events related to liability coverage for damages
    611, ..., 613 Parameters measuring the occurrence of events 61
  62 Predefined risk events related to liability coverage for losses
    621, ..., 623 Parameters measuring the occurrence of events 62
  63 Predefined risk events related to liability coverage for delay in delivery
    631, ..., 633 Parameters measuring the occurrence of events 63
71, ..., 75 Occurred loss associated with the motor vehicles 41, ..., 45
  711, ..., 715 Captured loss parameters of measured predefined event 1
  721, ..., 725 Captured loss parameters of measured predefined event 2
  731, ..., 735 Captured loss parameters of measured predefined event 3
80 Aggregated loss parameter
81 Aggregated payment parameter
82 Variable loss ratio parameter
  821 Loss ratio threshold value
901 Triggering Sensory Data
902 Extracting Scoring Parameter Compound
903 Transmitting Scoring Compound To Central, Expert-system-based Circuit
904 Generating Shadow Request
905 Selecting Supplier Systems
906 Transmitting Shadow Request To Selected Supplier Systems
907 Filtering Responses Supplier Systems
908 Transmitting Result List To The User Unit For User or Automated Selection

The invention claimed is:

1. A telematics-based system triggering score-driven operations associated with a plurality of motor vehicles, the telematics-based system comprising:
  a plurality of on-board sensors in the motor vehicles, the on-board sensors configured to collect operational telematics data of the motor vehicles, and relay the collected operational telematics data to a plurality of telematics devices, the on-board sensors including at least a gyro sensor, an accelerometer sensor including a cantilever beam with a seismic mass, and a magnetoresistive permalloy sensor,
  the telematics devices being connected via a data transmission network to a central circuit of the telematics-based system, wherein a data link is set by a wireless connection between the telematics devices and the central circuit, at least the collected operational telematics data captured by the telematics devices being transmitted to the central circuit via the data transmission network; and
  the central circuit configured to:
    generate a compound set of parameters based upon the captured operational telematics data, the compound set of parameters at least including (i) a first number based on at least number of intersections, (ii) a second number based on at least activated advanced driver assistance systems (ADAS)/adaptive features of the motor vehicles, and (iii) a third number based on at least lending period and number of passengers, and (iv) a fourth number based on the angle of the sun,
    score individual drivers based on the monitored operational telematics data, the compound set of parameters further including measured and generated variable scoring parameters profiling use and style and environmental condition of driving during operation of the motor vehicle based upon the triggered, captured, and monitored operational telematics data, and the variable scoring parameters at least include a measured driver score measuring behavioral parameters of a driver, and a contextual score being based at least on the number of intersections and/or road type, and a vehicle safety score being based at least on the activated ADAS/adaptive features of the motor vehicle, and a mobility score being based at least on the lending period and number of passengers, and a trust-worthiness score being based at least on a measured care of assets score, a peer-to-peer lending score, a car sharing score, a transportation services risk score, and a vehicle type score, the compound set of parameters being at least based upon (i) a first measure of driver behavior parameters having speed, acceleration, braking, cornering, or jerking, (ii) a second measure of distraction parameters having a mobile phone usage while driving, (iii) a third measure of fatigue parameters, alcohol use parameters, or drug use parameters, (iv) measured trip score parameters based on a road type, a number of tunnels, or a number of elevations, (v) measured time of travel parameters, (vi) measured weather parameters, (vii) measured location parameters, and (viii) measured distance driven parameters, transmit a request to at least one of first transfer systems decentrally connected to the central circuit over the data transmission network, the request including at least the compound set of parameters generated based upon the captured operational telematics data, and dynamically collect the compound set of parameters, and generate profiles for a corresponding motor vehicle based upon the dynamically collected compound set of parameters, wherein in response to the transmitted request, the profiles are transmitted from the at least one of first transfer systems to a user circuit associated with the corresponding motor vehicle, upon selection of one of the profiles by a user, the selected profile is automatically transferred from the corresponding motor vehicle to the at least one of first transfer systems, wherein at least one profile, which is transmitted from the at least one of first transfer systems to the motor vehicles, is displayed on a dashboard touchscreen of the corresponding motor vehicle for selection by the user of the corresponding motor vehicle, and in return of displaying the at least one profile over the user circuit, transfer parameters are transmitted from the at least one of first transfer systems to a provider of the telematics-based system, and wherein the at least one profile, which is transmitted from the at least one of first transfer systems to the corresponding motor vehicle, is issued by a connected mobile telecommunication node application via the user circuit of the corresponding motor vehicle, wherein the profiles are selectable by the user by the mobile telecommunication node application, and upon selection of the at least one profile, a transfer associated with the selected profile is automatically performed from the corresponding motor vehicle to the at least one of first transfer systems, and wherein the profiles of the first transfer systems are only issued by the user circuit of the corresponding motor vehicle for selection by the user of the corresponding motor vehicle when an issuance is permitted by the telematics-based system.

2. The telematics-based system according to claim 1, wherein the telematics devices comprising one or more wireless connections or wired connections and a plurality of interfaces to connect with at least one of the motor vehicles' data transmission bus, and a plurality of interfaces to connect with the plurality of on-board sensors, wherein, for providing the wireless connection, the telematics devices act as wireless nodes within the data transmission network by antenna connections of the telematics devices and the telematics devices are connected via the interfaces to the plurality of on-board sensors and an in-car interactive device.

3. The telematics-based system according to claim 2, wherein the plurality of on-board sensors and the in-car interactive device include proprioceptive sensors for sensing operating parameters of the motor vehicles and exteroceptive sensors for sensing environmental parameters during operations of the motor vehicles.

4. The telematics-based system according to claim 1, further comprising:
a second transfer system associated with the central circuit, the second transfer system configured to provide a second transfer based on second transfer parameters from the first transfer systems to the second transfer system, receive, and store second parameters for pooling of risks of the first transfer systems associated with risk exposures transferred to the first transfer systems.

5. The telematics-based system according to claim 1, wherein the compound set of parameters further include the driving score, a pricing score, a usage and operation of ADAS score, a usage and operation of autonomous vehicle systems score, and a credit score.

6. The telematics-based system according to claim 1, wherein the request further comprises risk-relevant parameters based upon the captured operational telematics data.

7. The telematics-based system according to claim 1, wherein the request is transmitted to a corresponding first transfer system when transmission of the request is permitted by the user circuit.

8. The telematics-based system according to claim 1, wherein the transmission of the request to a specific first transfer system depends on a definable distribution table included in the user circuit, the definable distribution table having a variable list with at least one first transfer system.

9. The telematics-based system according to claim 1, wherein the compound set of parameters are at least based upon measured ADAS feature activation parameters, measured vehicle crash test rating parameters, measured level of automation parameters of the corresponding motor vehicle, and measured software risk scores parameters.

10. The telematics-based system according to claim 1, wherein the profiles provided by the first transfer systems time-dependently vary based on the compound set of parameters measuring time-dependent use, the style, and the environmental condition of the driving during operation of the corresponding motor vehicle.

11. The telematics-based system according to claim 1, wherein the first transfer systems are realized as automated first transfer systems to provide a first transfer based on first transfer parameters from the motor vehicles to a respective first transfer system configured to receive and store first parameters associated with transfer of risk exposures of the motor vehicles for pooling of the motor vehicles' risks.

12. The telematics-based system according to claim 6, wherein the risk-relevant parameters of the request comprise at least parts of the set compound of parameters and at least parts of the operating telematics data captured by vehicle embedded telematics devices or a mobile phone application as the user circuit.

13. The telematics-based system according to claim 2, wherein the one or more wireless connections or wired connections of vehicle embedded telematics devices are using a radio band from 2.4 to 2.485 GHz by building a personal area networks with on-board wireless capabilities.

\* \* \* \* \*